United States Patent [19]
Haut et al.

[11] Patent Number: 6,070,890
[45] Date of Patent: Jun. 6, 2000

[54] INFANT CARRIER MOUNTING SYSTEM

[75] Inventors: Robert E. Haut, Paoli; Michael L. Longenecker, Ephrata; Robert T. Pike, Reading, all of Pa.

[73] Assignee: Graco Children's Products Inc., Elverson, Pa.

[21] Appl. No.: 08/927,019

[22] Filed: Sep. 10, 1997

[51] Int. Cl.$^7$ .................................. B62B 7/04; B60N 2/28
[52] U.S. Cl. .................... 280/47.38; 280/30; 280/643; 297/130; 297/256.16
[58] Field of Search .......................... 280/30, 638, 647, 280/643, 648, 47.38; 297/256.16, 130

[56] References Cited

U.S. PATENT DOCUMENTS

| | | | |
|---|---|---|---|
| D. 302,410 | 7/1989 | Tucker et al. | D12/129 |
| D. 306,711 | 3/1990 | Bolanos et al. | D12/129 |
| D. 310,054 | 8/1990 | Tucker et al. | D12/129 |
| D. 330,528 | 10/1992 | Allen et al. | D12/129 |
| D. 331,208 | 11/1992 | Peebles et al. | D12/129 |
| D. 332,590 | 1/1993 | Robinson | D12/129 |
| D. 345,720 | 4/1994 | Pohl | D12/129 |
| D. 361,743 | 8/1995 | Matsumoto et al. | D12/129 |
| D. 375,473 | 11/1996 | Huang | D12/129 |
| 2,805,076 | 9/1957 | Thomas | 280/41 |
| 3,054,637 | 9/1962 | Pambello | 297/4 |
| 3,116,069 | 12/1963 | Dostal | 280/30 |
| 3,659,865 | 5/1972 | Nothacker | 280/7.1 |
| 3,829,113 | 8/1974 | Epelbaum | 280/30 |
| 4,113,306 | 9/1978 | von Wimmersperg | 297/216 |
| 4,537,414 | 8/1985 | Nusbaum | 280/47.41 |
| 4,620,711 | 11/1986 | Dick | 280/30 |
| 4,679,804 | 7/1987 | Johnson | 280/30 |
| 4,685,688 | 8/1987 | Edwards | 280/30 |
| 4,762,331 | 8/1988 | Tucker et al. | 280/30 |
| 4,768,795 | 9/1988 | Mar | 280/30 |
| 4,786,064 | 11/1988 | Baghdasarian | 280/30 |
| 4,828,281 | 5/1989 | Sanchas | 280/30 |
| 4,832,354 | 5/1989 | LaFreniere | 280/30 |
| 4,861,105 | 8/1989 | Merten et al. | 297/256.17 |
| 4,874,182 | 10/1989 | Clark | 280/30 |
| 4,878,680 | 11/1989 | Molnar | 280/30 |
| 4,896,894 | 1/1990 | Singletary | 280/30 |
| 4,946,180 | 8/1990 | Baer | 280/39 |
| 4,989,888 | 2/1991 | Qureshi et al. | 280/30 |
| 5,104,134 | 4/1992 | Cone | 280/30 |
| 5,133,567 | 7/1992 | Owens | 280/30 |
| 5,149,113 | 9/1992 | Alldredge | 280/30 |
| 5,188,380 | 2/1993 | Tucek | 280/30 |
| 5,230,523 | 7/1993 | Wilhelm | 280/30 |
| 5,234,224 | 8/1993 | Kim | 280/30 |
| 5,277,472 | 1/1994 | Freese et al. | 297/130 |

(List continued on next page.)

FOREIGN PATENT DOCUMENTS

| | | |
|---|---|---|
| 008787 | 4/1991 | Germany . |
| 233901 | 10/1994 | Taiwan . |
| 251543 | 11/1995 | Taiwan . |
| 293337 | 11/1996 | Taiwan . |

OTHER PUBLICATIONS

Sell sheet, infant carrier mounting system; Cosco, Inc., 2525 State Street, Columbus, Indiana 47201. Publication date Mar., 1997.

P. 1, infant carrier mounting system; Kolcraft Enterprises, Inc., 3455 West 31st Place, Chicago, Illinois 60623. Publication date 1997.

Pp. 22 and 25, infant carrier mounting system; Century Products Company, 9600 Valley View Road, Macedonia, Ohio 44056. Publication date 1996.

Pp. 2 and 3, infant carrier mounting system; Evenflo Company, Inc., a Lisco Company, 601 South Harbour Island Boulevard, Suite 200, Tampa, Florida 33602. Publication date 1996.

*Primary Examiner*—Lanna Mai
*Assistant Examiner*—Lynda Jasmin
*Attorney, Agent, or Firm*—Foley & Lardner

[57] ABSTRACT

An infant carrier includes provisions that allow the infant carrier to easily and conveniently mount to either a stroller or a base. The infant carrier also includes an actuator that operates both the stroller and base releasing mechanisms.

41 Claims, 27 Drawing Sheets

U.S. PATENT DOCUMENTS

| | | | |
|---|---|---|---|
| 5,360,221 | 11/1994 | Chai | 280/30 |
| 5,385,386 | 1/1995 | Beamish et al. | 297/256.16 |
| 5,385,387 | 1/1995 | Kain | 297/256.16 |
| 5,398,951 | 3/1995 | Ryu | 280/30 |
| 5,478,096 | 12/1995 | Ting | 280/30 |
| 5,499,831 | 3/1996 | Worth et al. | 280/30 |
| 5,676,386 | 10/1997 | Huang | 280/30 |
| 5,727,798 | 3/1998 | Walters et al. | 280/30 |
| 5,772,279 | 6/1998 | Johnson, Jr. | 280/30 |
| 5,855,384 | 1/1999 | Pike et al. | 280/47.38 |

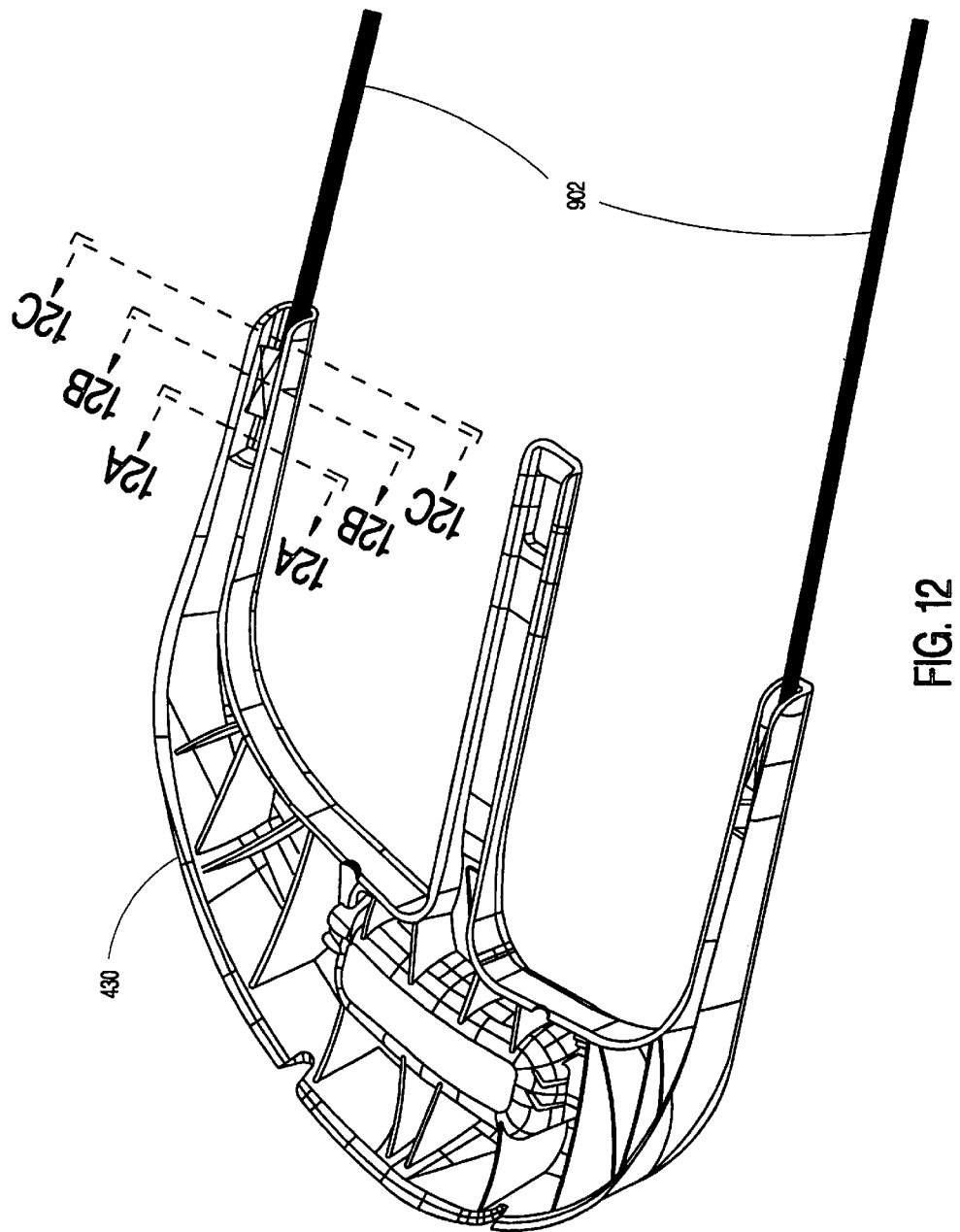

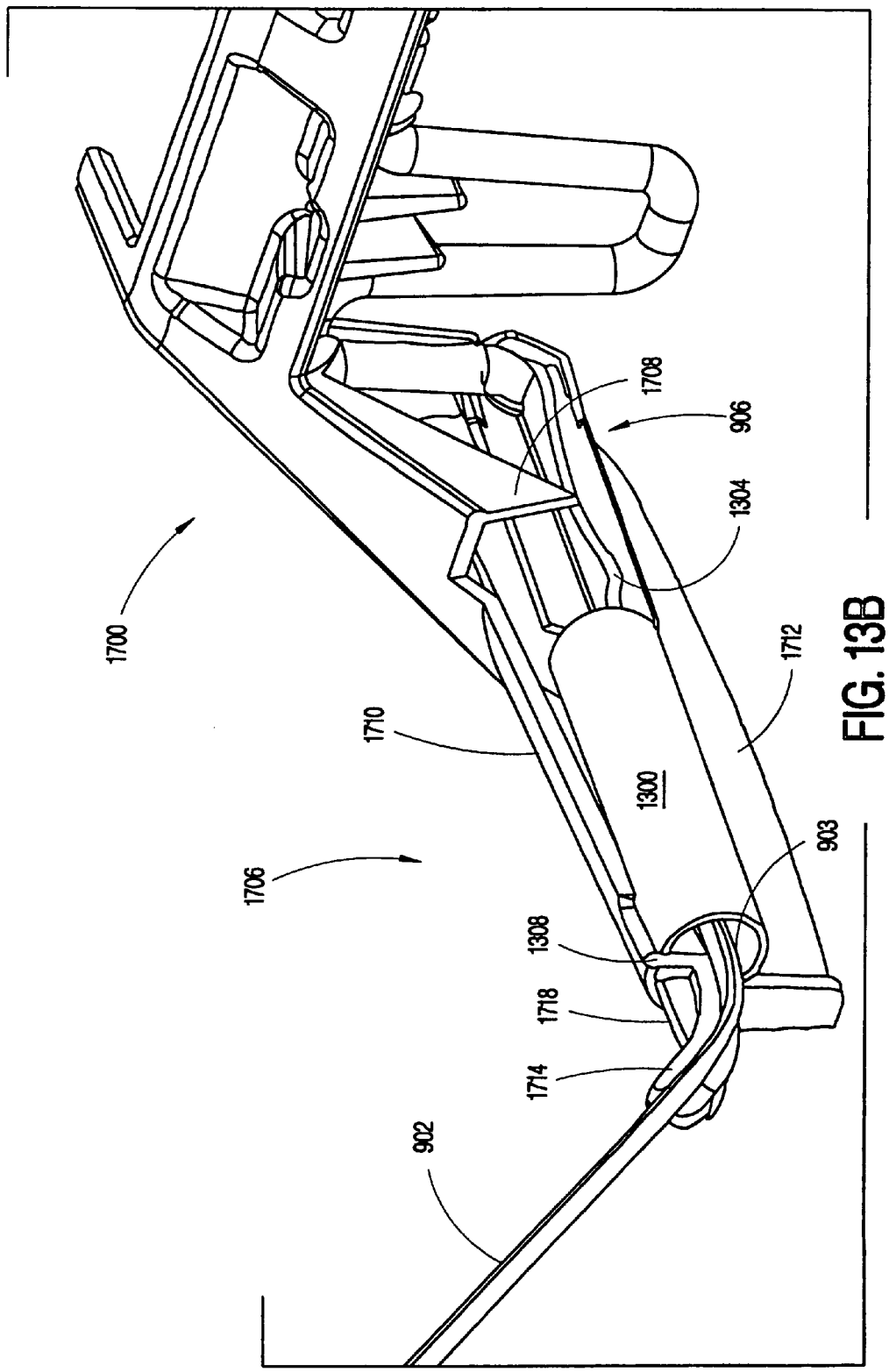

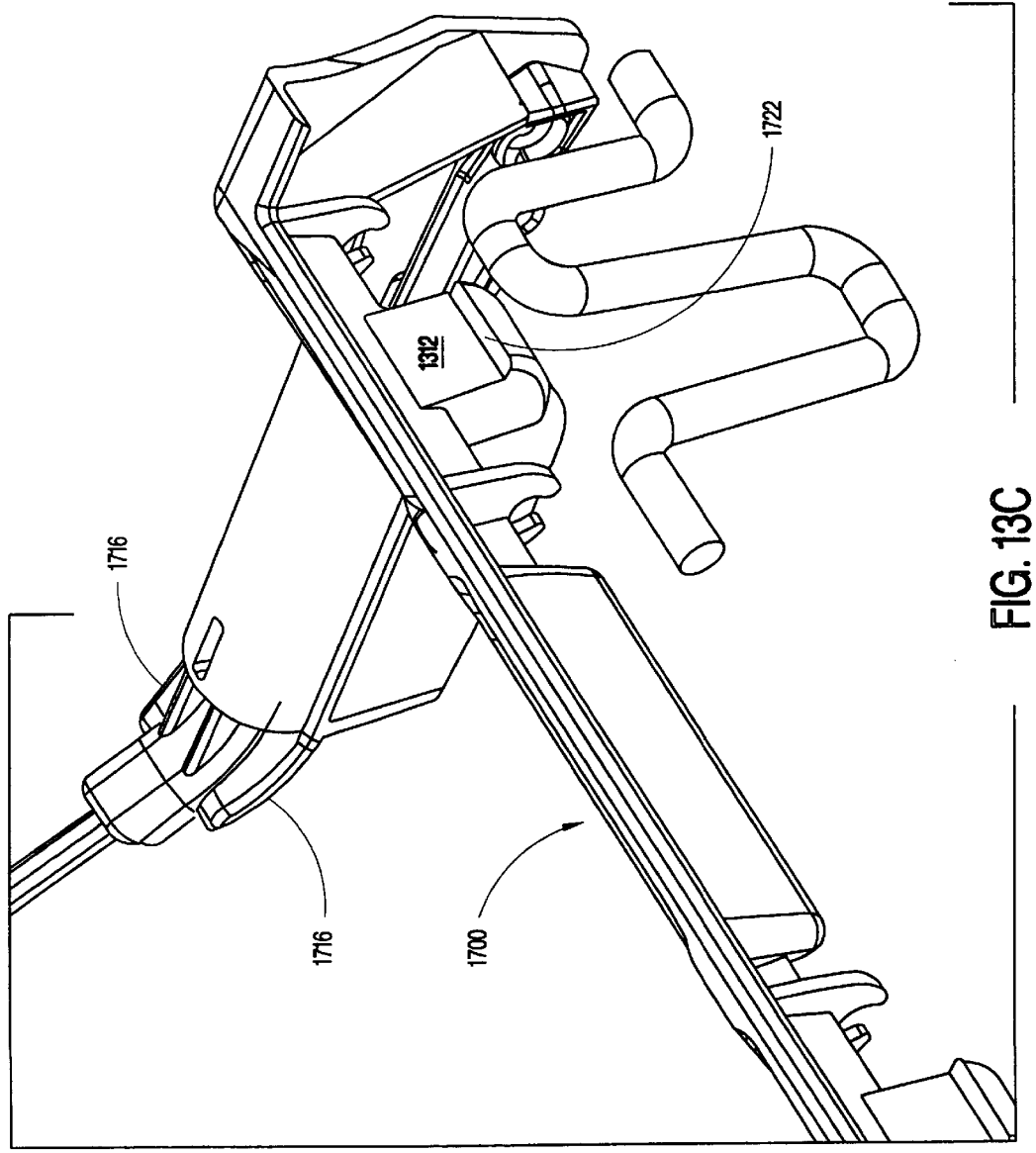

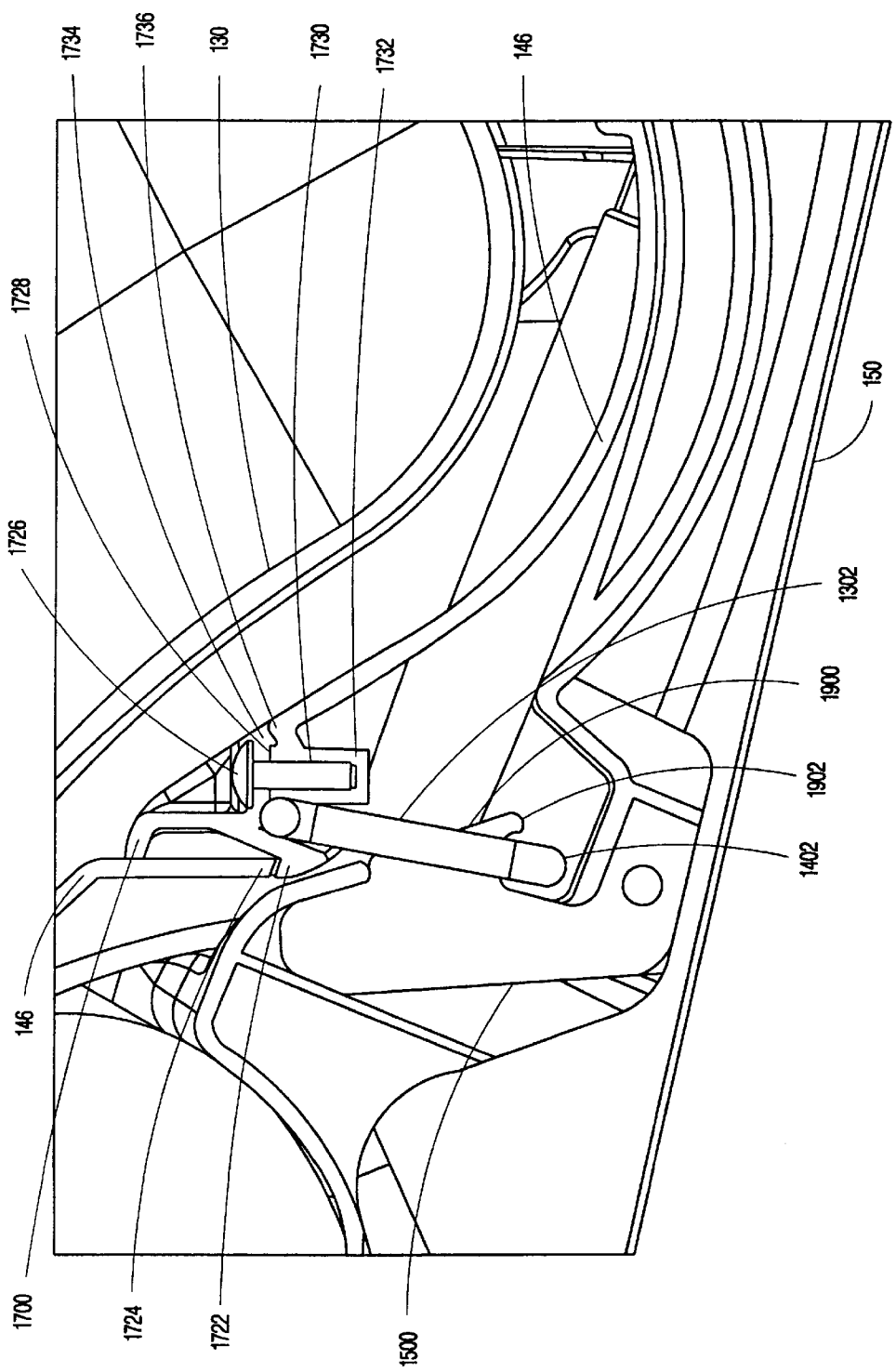

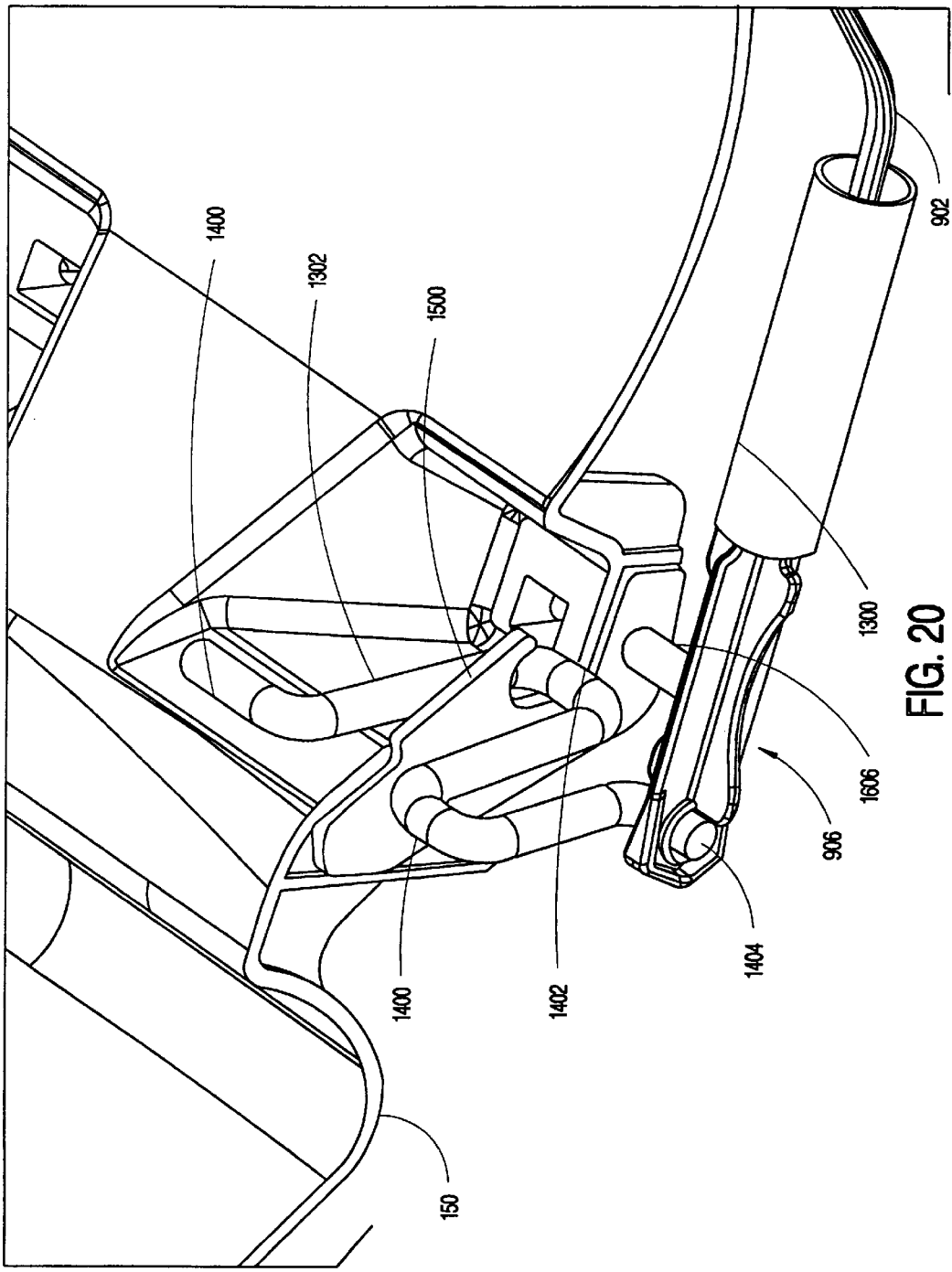

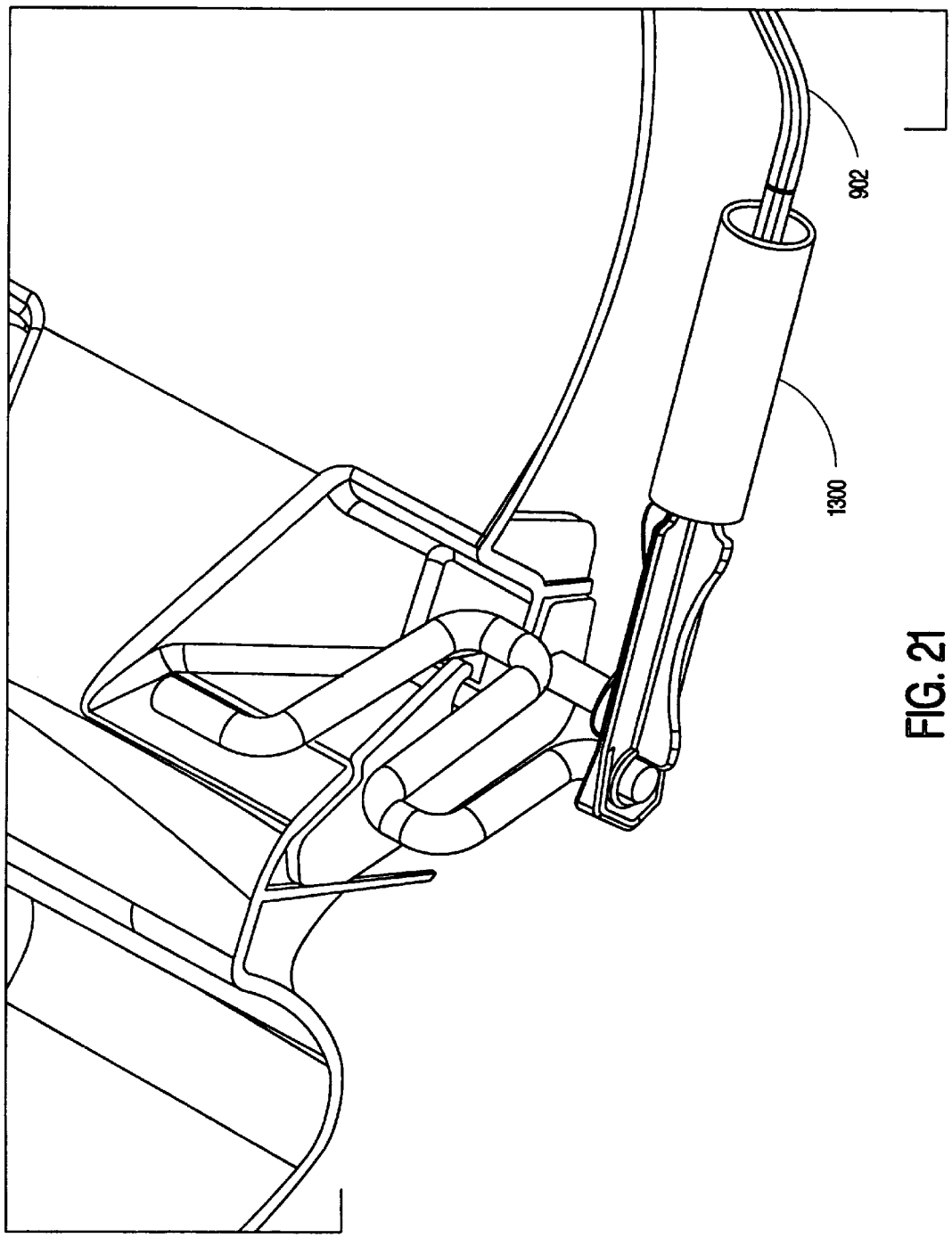

INFANT CARRIER MOUNTING SYSTEM

RELATED APPLICATIONS

This application is related to several other patent applications which are commonly owned by the Assignee of this application. Those related applications are: U.S. patent application Ser. No. 08/927,398, filed Sep. 10, 1997; and U.S. patent application Ser. No. 08/926,983, filed Sep. 10, 1997, both of which are incorporated by reference.

BACKGROUND OF THE INVENTION

1. Field of the Invention

The following invention is directed to a juvenile product system, and more particularly to a juvenile product system that provides an infant carrier mountable to a stroller and a base.

2. Description of the Related Art

Infant carriers are well-known in the art. However, a system that allows the infant carrier to mount to various related juvenile products, for example, strollers and bases, is generally mechanically complex, is difficult to produce and assemble, requires the use of additional hardware and adapters, and difficult and/or confusing to operate.

In the conventional systems, the release of the connection between the infant carrier and the base is difficult to operate. Many systems require multiple parts to be moved simultaneously in order to release the connection. Numerous conventional systems include a releasing mechanism in the base as opposed to the infant carrier. Many times this releasing mechanism requires an operator to use both hands to release the infant carrier from the base.

Also in many conventional systems, the connection between the stroller and the infant carrier requires additional structural elements to be added to the stroller to support the infant carrier. Usually, since these additional elements do not serve any function, they must be removed when the infant carrier is separated from the stroller in order to use the stroller.

SUMMARY OF THE INVENTION

Accordingly, the present invention is directed to a system of a stroller, base, and an infant carrier that substantially obviates one or more of the disadvantages of the related art systems.

An object of the present invention is to provide a infant carrier that allows an operator to easily mount the infant carrier to a stroller or a base.

Another object of the present invention is to provide a connection between a stroller and an infant carrier that does not require any elements to be removed in order to use the stroller.

Another object of the present invention is to provide a design that is easy and economical to manufacture.

Another object of the present invention is to provide a design that is easy to use.

Another object of the present invention is to provide a connection mechanism that may be released with one hand.

Another object of the present invention is to provide a connection mechanism with an actuator positioned in a location to simplify the release of the infant carrier from the stroller and the base.

Another object of the present invention is to provide an actuator that simultaneously moves the latches of the connecting mechanism.

Additional features and advantages of the invention will be set forth in the description to follow, and in part will be apparent from the description, or may be learned by practice of the invention. The objectives and other advantages of the invention will be realized and attained by the structure particularly pointed out in the written description and claims as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings:

FIG. 12 is an isometric view of the connection between the actuator and the flexible member;

FIGS. 13A–13C are various isometric views of the connection between the flexible member and the latch;

FIG. 19 is an enlarged view of the fixed mounting member and the latch depicting the latch in its locked positions;

FIG. 20 is an enlarged view of the latch in its locked position; and

FIG. 21 is an enlarged view of the latch in its released position.

DETAILED DESCRIPTION OF THE PREFERRED EMBODIMENTS

Reference will now be made in detail to the preferred embodiments of the present invention, examples of which are illustrated in the accompanying drawings.

Figure 1:
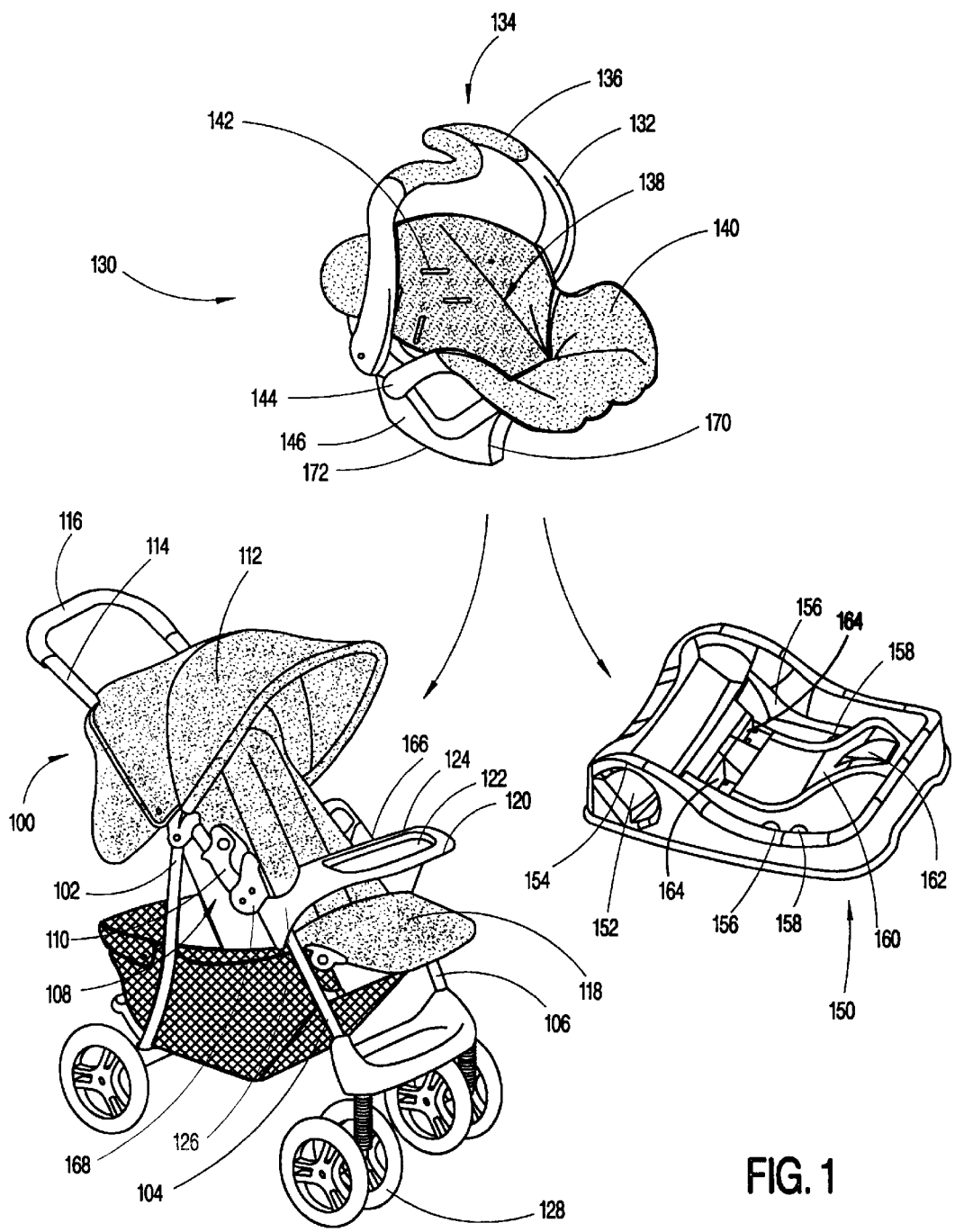
FIG. 1 is an isometric view of a juvenile product kit, including an infant carrier, a stroller, and a base in accordance with the present invention.

An embodiment of the invention includes a juvenile product kit including a stroller, a base, and an infant carrier that can be mounted to the stroller or the base. The interconnection between the infant carrier 130 and stroller 100 and the infant carrier 130 and base 150 is generally shown in FIG. 1 by the dashed line arrows. Generally, the stroller includes a latching mechanism 108 to allow folding of the stroller, and a child restraining member 120, such as a tray or arm bar. The base 150 may be mounted on the seat of a vehicle and includes an opening 152 for a seat belt (not shown) to fasten the base 150 to a seat (not shown). The base 150 also includes at least one fixed mounting member to secure the infant carrier 130 to the base 150.

The infant carrier 130 generally includes a handle 132, a frame 146, and a connection mechanism. The connection mechanism includes a first latch (i.e., a catch) disposed near one end of the carrier 130 and a second latch mechanism (preferably two wire latches) disposed near the other end. The catch engages the child restraining member 120 of the stroller 100 when the infant carrier 130 is mounted to the stroller 100. When the infant carrier 130 is mounted to the base 150, the catch engages a reinforced lip disposed in a cavity 162, and the preferred wire latch mechanism engages two fixed mounting member of the base 150. Thus, the infant carrier 130 mounts to the base 150 at three locations (preferably in a triangular configuration).

The preferred connection mechanism also includes an actuator connected to the catch and the wire latch mechanism. When the actuator is pulled, both the catch and the wire latch mechanism move to an unlocking position simultaneously and the infant carrier 130 may be conveniently removed from the stroller 100 or the base 150 by using the same actuator.

Referring to FIG. 1, several details of a preferred embodiment of a stroller 100, a base 150, and an infant carrier 130 will now be discussed in turn. The preferred stroller shown in FIG. 1 is intended to be exemplary of the many types of strollers that may be used. A preferred stroller is shown in commonly owned U.S. Pat. No. 5,454,584, issued on Oct. 3, 1995, which may be studied for the details of operation of the stroller and which is incorporated herein by reference.

Preferably, the stroller 100 includes a frame 102 comprising front tubes 104, 106 and rear tubes, a handle 114 having a gripping portion 116, and wheels 128 attached to the bottom of the tubes. A latching mechanism 108 permits the frame 102 of the stroller 100 to operate between a collapsed position and a deployed position. The latching mechanism 108 comprises hinges 168 and a slidable catch 110. The preferred stroller 100 also includes a canopy 112, a seat 118, and a child restraining member 120 connected to the frame 102.

As shown in FIG. 1, the child restraining member 120 is connected to the front tubes of the frame 102. The preferred child restraining member 120 includes an upper surface 122 and two side members 126 connected to the front tubes 104, 106. Each side member 126 has a connecting portion and a tab (not shown in FIG. 1) that is secured to a front tube 104. The connecting portion is substantially circular and is snapped onto the front tube 104. Adjacent to each connecting portion is a tab that facilitates the separation of the connecting portion from the front tube 104. The child restraining member 120 is easily removed from the frame 102 by pulling outward on the tab to snap the connecting portion off the front tube 104. The details of the connecting portion and the tabs will be described in greater detail later.

The preferred embodiment of the child restraining member 120 is a tray. The tray 120 includes an upper surface 122 having a lip 124 around its perimeter. The lip 124 defines an area to hold objects (not shown). The inner side of the tray 120 has a portion defining a notch 166 (more clearly shown in FIG. 5). The notch 166 may be located at any appropriate location along the inner surface of the tray 120 and may be any appropriate shape that serves the notch's function, which will be described in greater detail later. Of course, it should be understood that an arm bar structure could be utilized for the child restraining member, which bar structure does not include a flat tray surface, while still achieving many of the broader objects of the present invention.

Preferably, the side members 126 of the tray 120 are an appropriate length to provide the clearance to permit the collapsing of the stroller 100 while the tray 120 is attached to the front tubes 104, 106. It is noted that the tray 120 may be used with any appropriate stroller. While the preferred material of the tray is plastic, any suitable material may be used.

Turning now to the base, the preferred base 150 has an arch 154 on each side that defines an opening 152 for a seat belt (not shown). The seat belt secures the base 150 to the seat of a vehicle (not shown).

The base also includes two receiving grooves 156 on its upper surface, each receiving groove having a projection 158 extending upward. The base 150 includes a rear portion 160 defining a cavity 162, which will be described later, and two recesses 164, each containing a fixed mounting member (not shown). The fixed mounting members are mounted to the base 150 by flanges and a fastener (not shown). The cavity 162 and the two recesses 164 generally locate three preferred attachment points to interconnect with the infant carrier 130. The details of the mounting arrangement will be described later. The fixed mounting members are mounted in the recesses 164 in the base 150 to avoid accidental contact when the infant carrier 130 is not mounted on the base 150.

While metal is the preferred material for the fixed mounting members, any suitable material may be used. Preferably, the base is made of plastic. However, any suitable material may be used.

The preferred embodiment of the infant carrier of the invention is shown in FIG. 1. The infant carrier 130 includes a handle 132, a frame 146, and a connection mechanism (not shown). The handle 132 of the infant carrier 130 is mounted to the frame 146. The handle 132 includes a gripping portion 134 having a cushioning material 136 to facilitate carrying the infant carrier 130. The person carrying the infant carrier 130 may grip the gripping portion 134 at a variety of locations. The handle 132 operates between several different positions.

The connection mechanism is mounted in the rear of the infant carrier 130 and is operated to release the infant carrier 130 from the stroller 100 and the base 150.

The frame 146 of the infant carrier 130 includes side extensions 144, and defines a cavity 138 to hold the infant. The cavity 138 is lined with a cushion lining 140 that provides a comfortable surface for the infant.

Preferably, the frame 146 of the infant carrier 130 also includes a pair of side extensions 144 located on each side of the frame 146. The side extensions 144 are supported on the latching mechanism 108 (i.e., sliding latch 110) of the stroller 100.

Preferably, the frame 146 of the infant carrier 130 and the cushion lining 140 each have slots 142 for the mounting of a belt (not shown) to secure an infant in the infant carrier 130. The slots 142 are provided in pairs to hold ends of the belt. The infant carrier 130 includes a fastening mechanism (not shown) that functions with the belt to secure the infant in the infant carrier 130.

Figure 2:
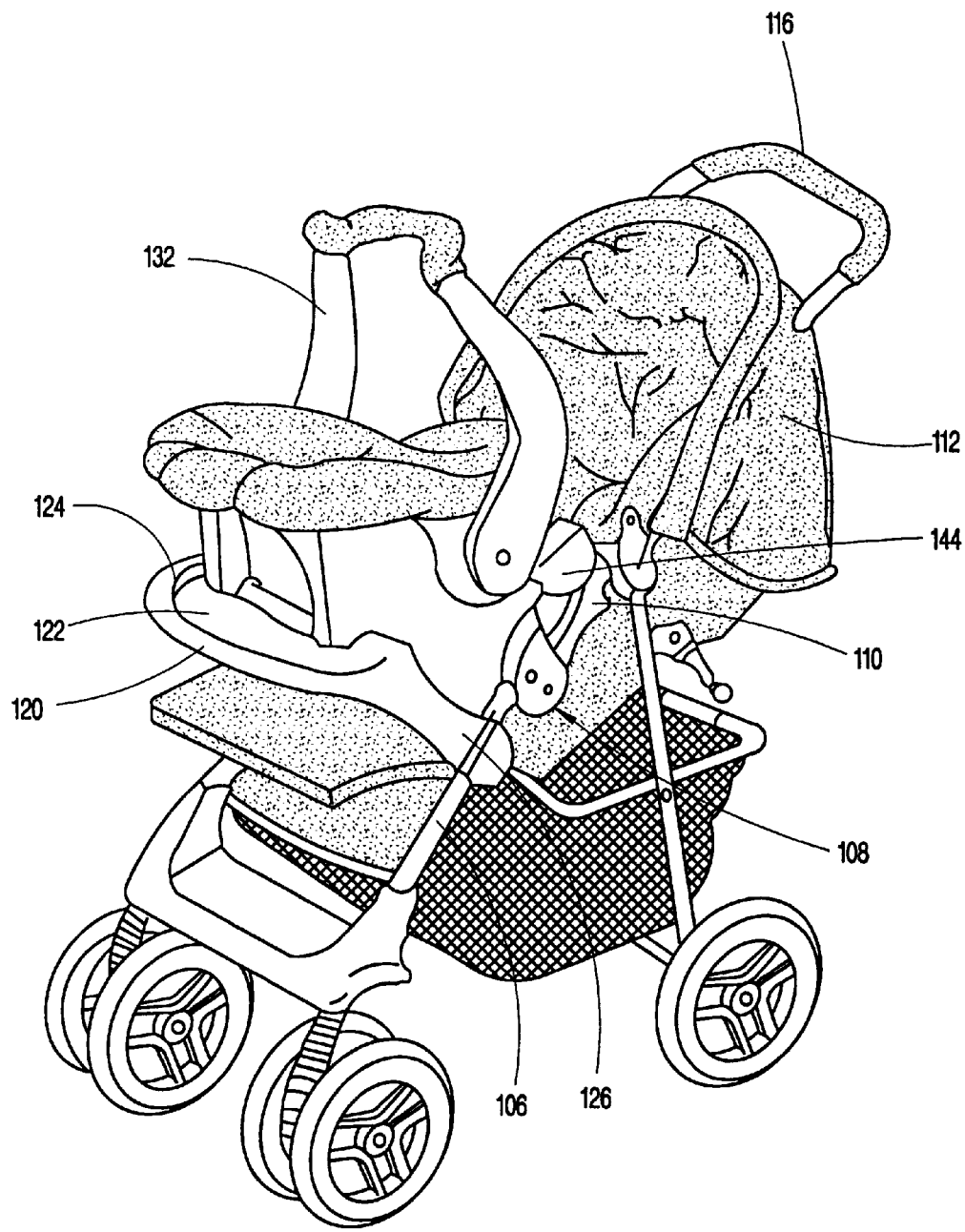
FIG. 2 is an isometric view of an infant carrier mounted on a stroller in accordance with the present invention.

Referring to FIG. 2, the connection between the infant carrier and the stroller is shown. An exemplary embodiment of the infant carrier 130 and stroller 100 combination of invention is shown. The infant carrier 130 is supported by the frame 102 of the stroller 100. In the embodiment shown in FIG. 2, the infant carrier 130 is supported on the latching mechanisms 108. In particular, the side extensions 144 of the infant carrier 130 are supported on the slidable catches 110. It is noted that the infant carrier 130 may be supported at any appropriate location on the frame 102.

Figure 3:
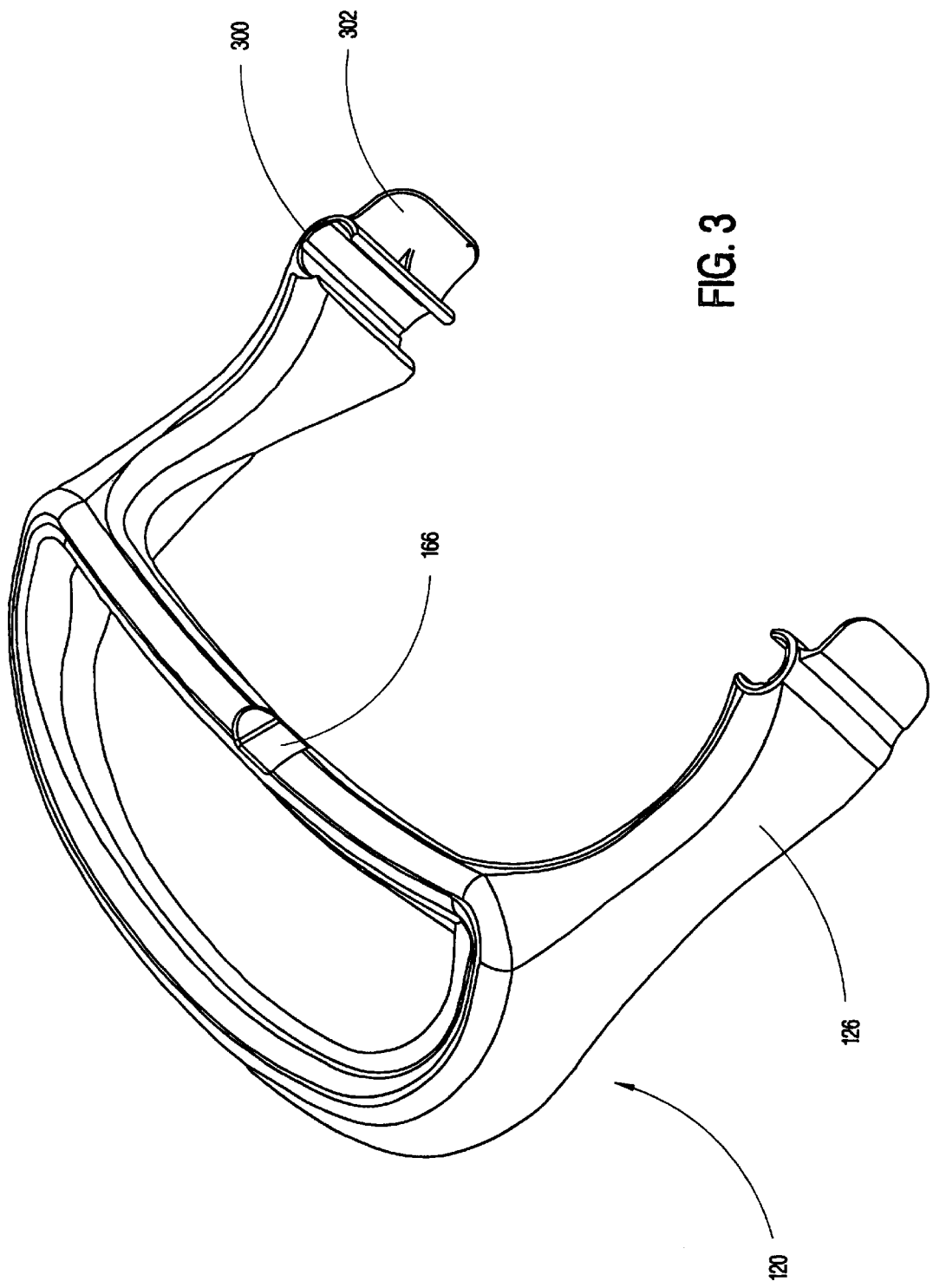
FIG. 3 is an isometric view of a stroller tray with a notch in accordance with the present invention.

Referring to FIG. 3, a preferred embodiment of the tray 120 of the invention is shown. The structure and mounting of an exemplary tray is disclosed in commonly owned U.S. Pat. No. 5,855,384, which is incorporated herein by reference. The tray disclosed is exemplary and any other appropriate tray or child restraining structure may be used.

The connecting portions 300 of the side members 126 as shown in greater detail in FIG. 3. The connecting portions 300 are substantially circular and form a gripping surface about the front tubes 104, 106. The tabs 302 are located adjacent to the connecting portions 300 in order to reduce the amount needed to snap the side members 126 off the front tubes 104, 106.

Figure 4:
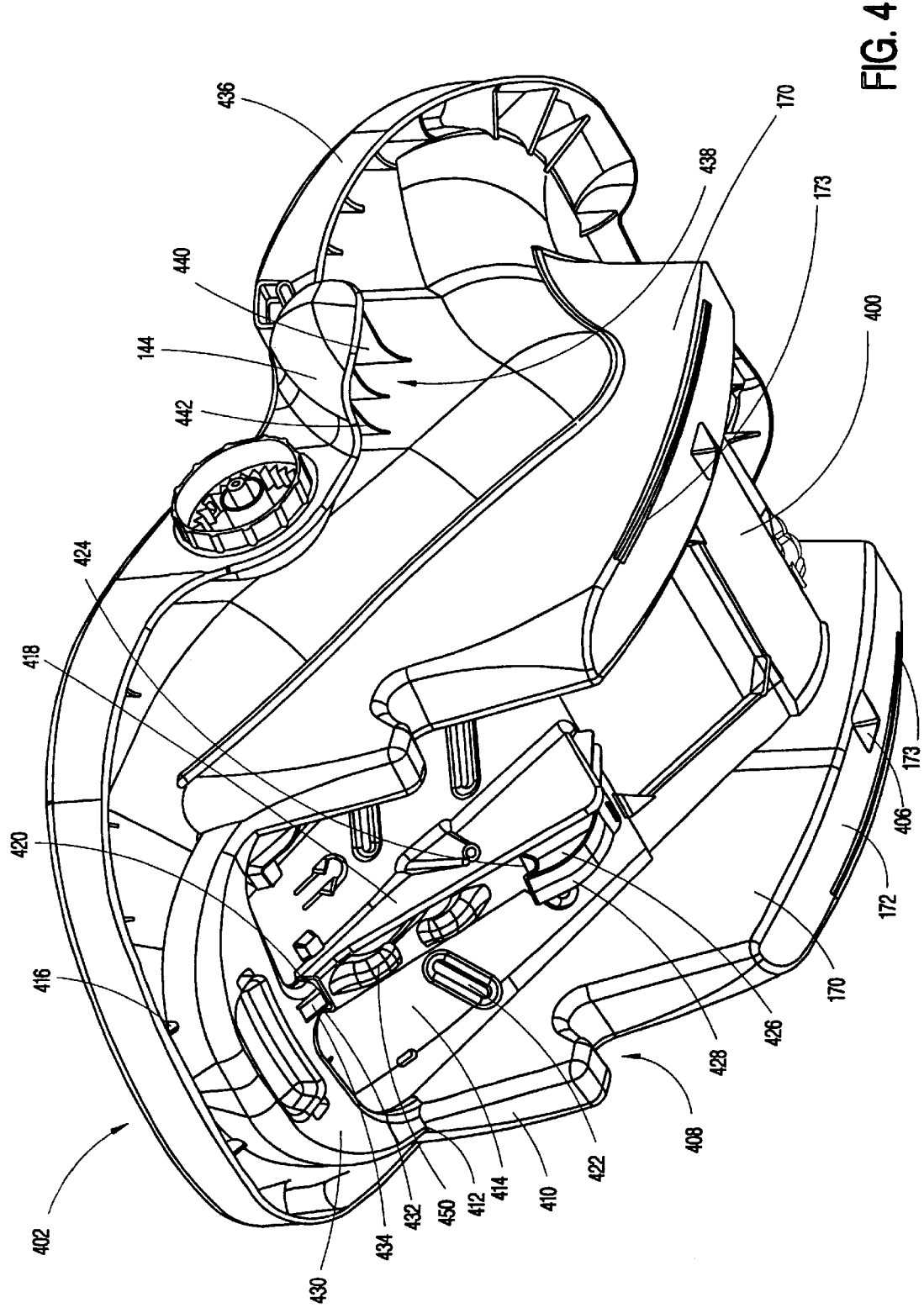
FIG. 4 is an isometric view showing the underside of the preferred infant carrier in accordance with the present invention.

Referring to FIG. 4, a bottom isometric view of the preferred embodiment of the frame 146 of the infant carrier 130 is shown. The infant carrier 130 includes a bottom portion 400, a back portion 414, side extensions 144, and a connection mechanism 402.

The bottom portion 400 has ridges 170 having apertures 406 and indentations 408. The ridges 170 also includes rear portions 410 having apertures 412. Each ridge 170 includes a rounded rocking portion 172. The rounded rocking portion 172 further includes a resilient cushioning strip to facilitate smooth rocking of the infant seat 130. The apertures 406 are engaged by the projections 158 in the receiving grooves 156 of the base 150 when the infant carrier 130 is mounted to the base 150. The ridges 170 also include an indentation 408, which is engaged by the lip 124 of the tray 120 when the infant carrier 130 is mounted to the stroller 100. Each ridge 170 further includes a rear portion 410 having an aperture 412.

The back portion 414 of the frame 146 is shown with a boss 418 having an aperture 420 toward the top of the boss 418, a vertical slot 424 toward the bottom, and clips 450 for guiding a shoulder belt. The back portion 414 also includes slots 422 for a belt (not shown) to secure an infant in the frame 146, as is conventional. The back portion 414 has two ribs 440 near the top of the back portion 414. The ribs 440 guide the movement of the actuator 430. The clips 450 may be located at any appropriate location on the infant carrier 130.

Preferably, the frame 146 of the infant carrier 130 also includes a side extension 144 on each side of the frame 146. The side extension 144 defines a cavity 438 with ribs 440 spaced throughout. The side extensions 144 form a part of the extension 436 that is around the perimeter of the frame 146. Preferably, the extension and side extensions 144 are integrally molded to the frame 146 of the infant carrier 130 and are made of similar material to that of the infant carrier 130. The side extension 144 defines a cavity 438 with ribs 440 spaced throughout the cavity 438. The number of ribs 440 and the spacing between them may vary.

The bottom surfaces 442 of the ribs 440 are curved to provide an appropriate contact surface to mate with the desired part of the stroller 100 providing support for the infant carrier 130. In the preferred embodiment, the ribs 440 are curved to mate with the latching mechanism 108 on each side of the stroller 100. In particular, the ribs 440 are supported on the slidable catch 110 of the latching mechanism 108 when the infant carrier 130 is mounted on the stroller 100.

Turning now to the connection mechanism discussed generally above, as shown in FIGS. 4 and 5A–5E, the preferred embodiment of the infant carrier 130 of the invention includes a connection mechanism 402. The connection mechanism 402 includes a catch 426 and an actuator 430.

The catch 426 is mounted in the boss 418 of the back portion 414 of the infant carrier 130. The catch 426 includes a curved portion 428 and a biasing portion (not shown). The biasing portion forces the curved portion to extends out of the vertical slot 424. When the infant carrier 130 is mounted on the stroller 100, the catch 426 engages the child restraining member 120 of the stroller 100.

The actuator 430 of the connection mechanism 402 is mounted to the frame 146 of the infant carrier 130. The actuator 430 has a body 500, a center arm 432, and two wings 504. Preferably, each wing 504 is parallel to the center arm 432. Each wing 504 also includes an arm 506.

The center arm 432 of the actuator 430 is mounted in the aperture 420 of the boss 418 on the infant carrier 130. The center arm 432 slides into the aperture 420. A shoulder 434 is located on the actuator 430 near the intersection of the center arm 432 and the body 500. The shoulder 434 limits the range of the movement of the center arm 432 into the boss 418. Each arm 506 of a wing 504 is mounted in the aperture 412 in the rear portion 410 on a ridge 170 on the infant carrier 130.

The center arm 432 of the actuator 430 has a portion defining an aperture 524. The biasing portion of the catch 426 is mounted through the aperture 524 to connect the actuator 430 and the catch 426. The wings 504 of the actuator 430 have connecting portions 508, the detail of which will be explained later.

Turning to the mounting of the infant carrier 130 to the stroller 100 and referring to FIGS. 1, 2, and 4, the infant carrier 130 is oriented so that the infant is facing the handle 114 of the stroller 100. The catch 426 operates between a locking position and an unlocking position. Initially, as the infant carrier 130 is lowered onto the stroller 100, the catch 426 contacts the tray 120 and is pushed inward due to the shape of the tray 120. As the infant carrier 130 is lowered further, the lip 124 of the tray 120 engages the indentations on the ridges 170 of the frame 146. Once the catch 426 is below the tray 120, the force from a biasing portion (not shown) biases the curved portion outward and underneath the tray 120.

Preferably, the catch 426 and the notch 166 in the tray 120 are aligned. In the locking position, the curved portion of the catch extends underneath the tray 120 and creates a gripping effect with the ridges 170 on the infant carrier 130 above the tray 120.

In order to release the infant carrier 130 from the tray 120, the actuator is pulled to move the catch to its unlocking position. As the actuator is pulled, the catch 426 pivots and the curved portion is withdrawn into the frame. In its unlocking position, the catch does not engage the tray 120 and the infant carrier 130 may be lifted upward and removed from the stroller 100. The tray 120 remains connected to the stroller 100 when the infant carrier 130 is removed. The tray 120 retains all of its functional features once the infant carrier 130 is removed and the stroller 100 is immediately ready for use with an appropriate age child.

Figure 5A:
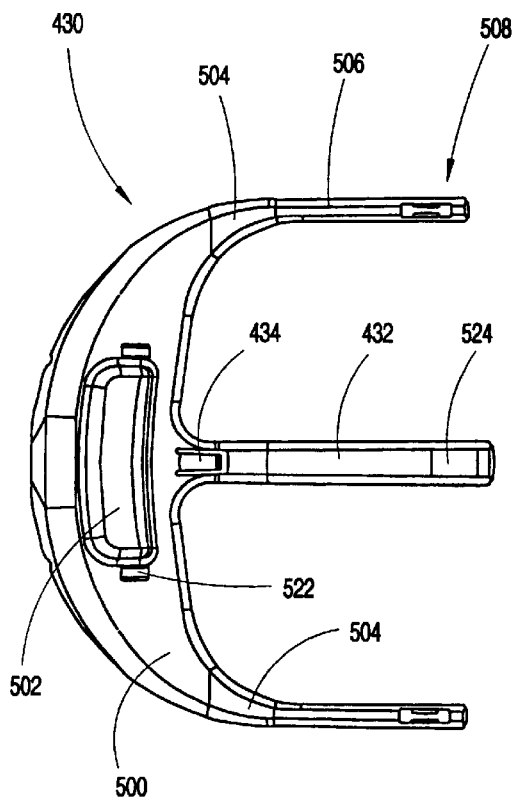
FIGS. 5A–5E are views of an actuator in accordance with the present invention.

Referring to FIGS. 5A through 5E, the preferred embodiment of the actuator 430 of the invention is shown. As shown in FIG. 5A, the actuator 430 includes wings 504, a center arm 432, and a body 500 defining a finger pull 502. The body 500 includes an aperture 522 on each side of the finger pull 502.

Figure 5B:
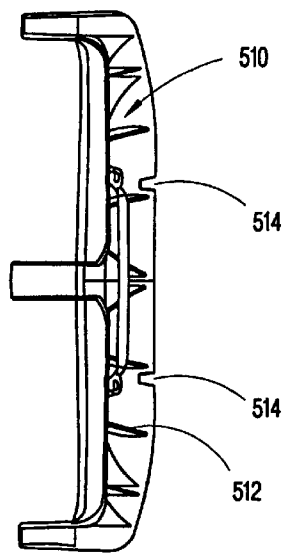

In FIG. 5B, a bottom view of the actuator 430 is shown. The body 500 of the actuator 430 defines a cavity 510 with ribs 512 spaced throughout. The bottom portion 416 of the actuator 430 also includes notches 514. The notches 514 are engaged by the ribs 416 on the back portion 414 of the frame 146 of the infant carrier 130. Together, the notches 514 and the ribs 416 guide the actuator 430 during its movement along the frame 146.

Figure 5C:
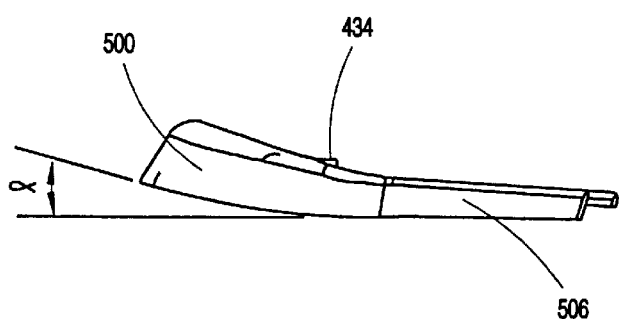

As shown in FIG. 5C, the wings 504 and the center arm 432 of the actuator 430 are mounted at an angle with respect to the body 500 of the actuator 430. This angle facilitates the movement of the actuator 430 along the frame 146.

Figure 5D:
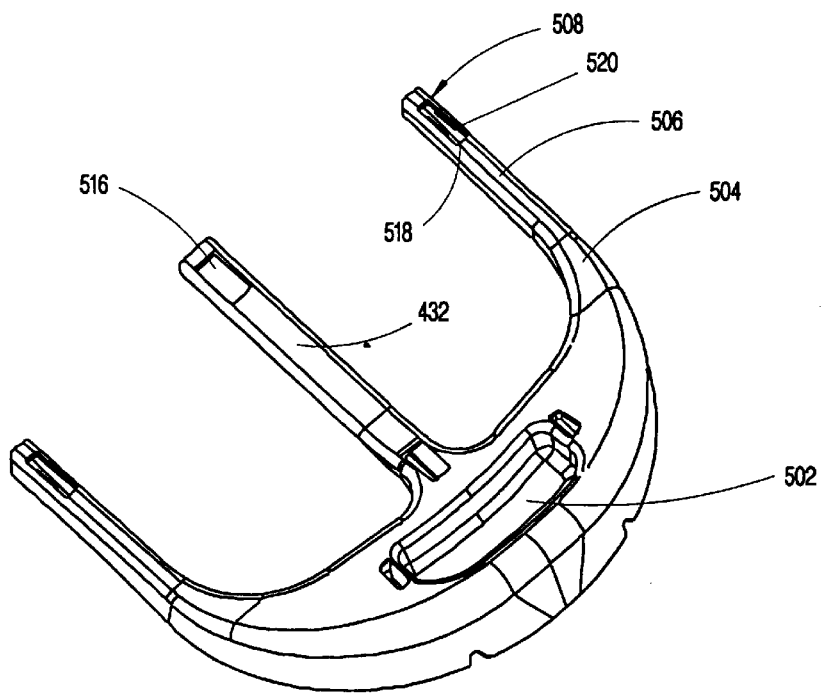
Figure 5E:
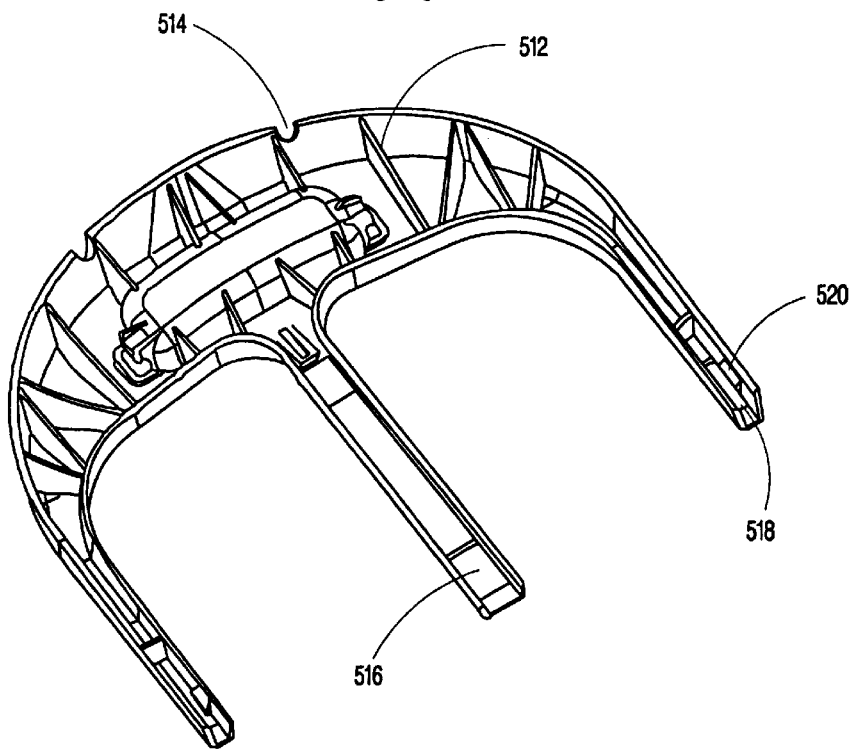

Referring to FIGS. 5D and 5E, the preferred embodiment of the connecting portions 508 of the wings 504 and the center arm 432 are shown. Preferably, each connecting portion 508 of a wing 504 includes a portion of the wing 504 defining an aperture 518 and tabs 520 extending into the aperture. The use of the tabs 520 will be explained in greater detail later. The center arm 432 includes an aperture 516 at one end.

The actuator 430 may be any shape provided that the appropriate connections to the catch 426 and the latches are provided. Preferably, the actuator is made of plastic, however any suitable material may be used.

A second preferred embodiment (not shown) of the actuator of the invention includes features similar to those of the actuator described above with the exception of the wings. The second embodiment does not have wings and the body of the actuator is smaller than the body of the first embodiment. The second embodiment includes a center arm with similar features to the center arm of the first embodiment. As can be appreciated, this second embodiment of the actuator may be preferably utilized where the infant carrier is only required to be interconnected to the stroller. The wings 504 are utilized for the operation of the wire latch and its connection to the base, and thus may be omitted.

Figure 6A:
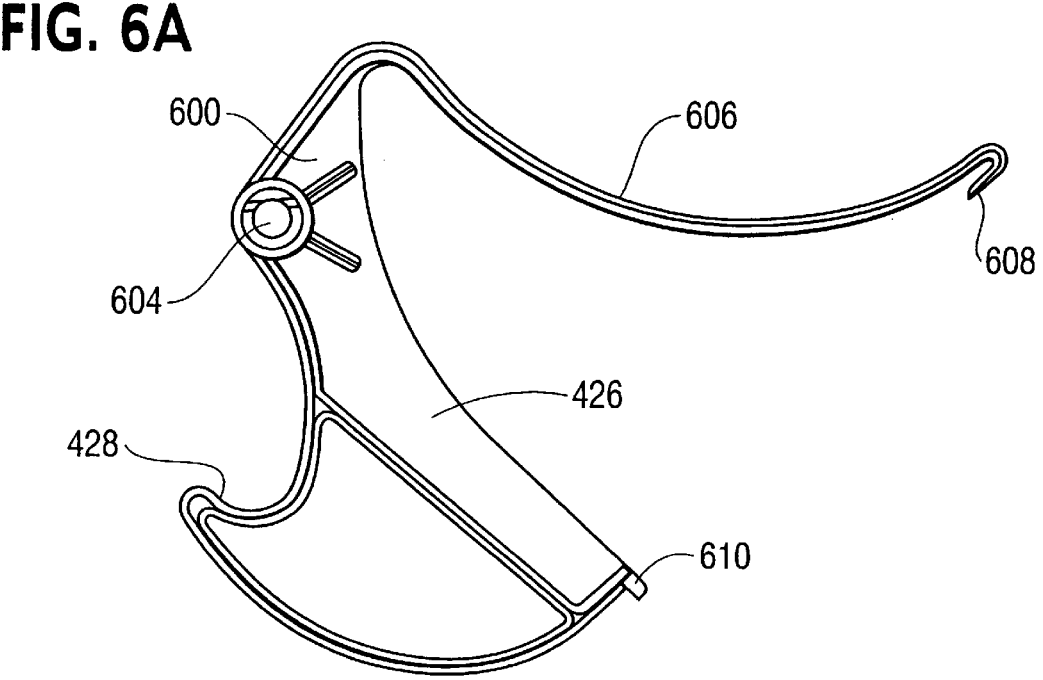
FIGS. 6A–6B are views of a catch in accordance with the present invention.
Figure 6B:
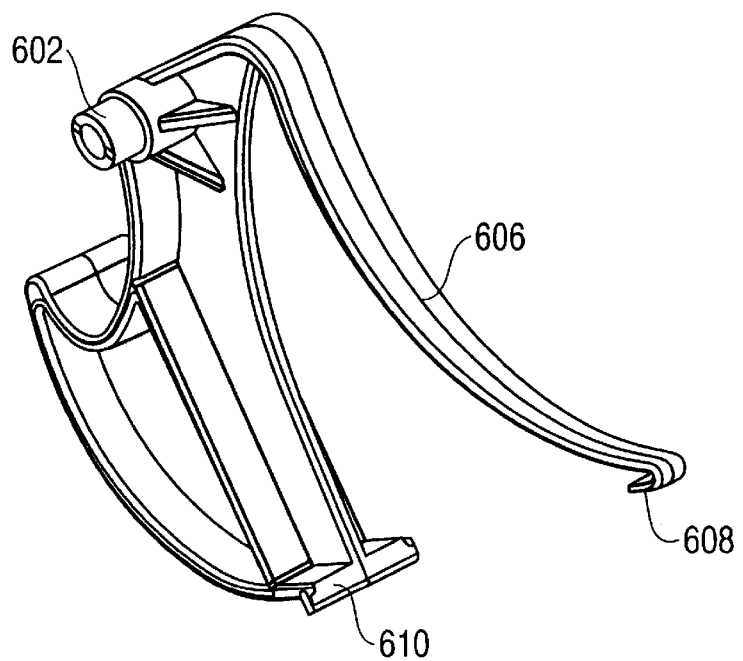

Referring to FIGS. 6A and 6B, the preferred embodiment of the catch is shown. The catch 426 includes a curved portion 428 that engages the tray 120 when the infant carrier 130 is mounted on the stroller 100. The catch 426 also includes a biasing portion 606 that has a hook 608 at one end. While the biasing portion 606 may be any appropriate shape that biases the curved portion 428 out of the vertical slot 424, preferably, the biasing portion 606 is a leaf spring. The catch 426 also includes a shoulder 610 at the end of the curved portion 428. The operation of the biasing portion 606 and the curved portion 428 will be discussed later.

The catch 426 also includes a connecting portion 600 having extensions 602 on both sides of the catch 426 and an aperture 604 through the extensions 602. The connecting portion 600 facilitates the mounting of the catch 426 to the frame 146 of the infant carrier 130 as set forth below.

Figure 7A:
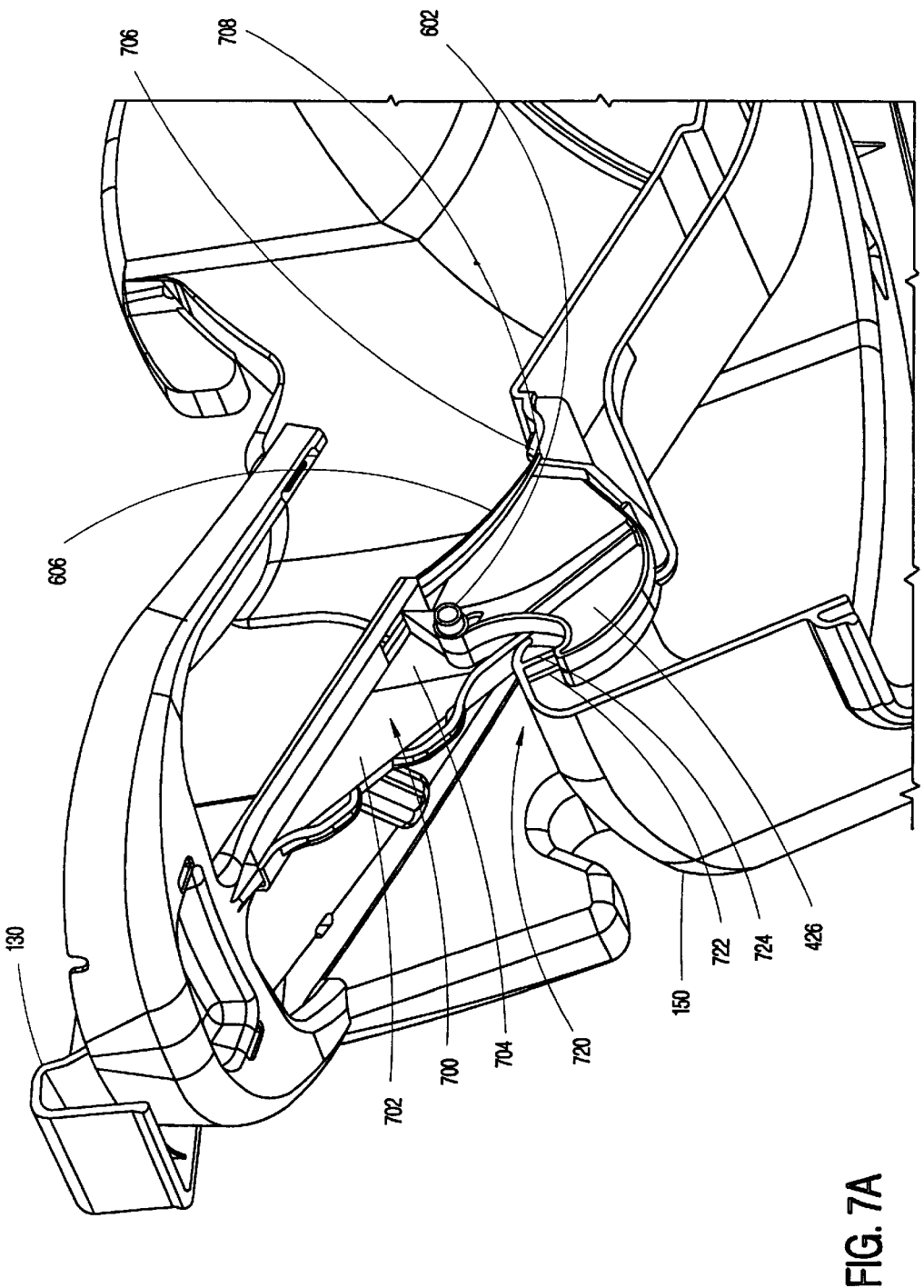
FIGS. 7A–7C are cross-sectional views of the catch engaging and disengaging the stroller tray in accordance with the present invention.
Figure 7B:
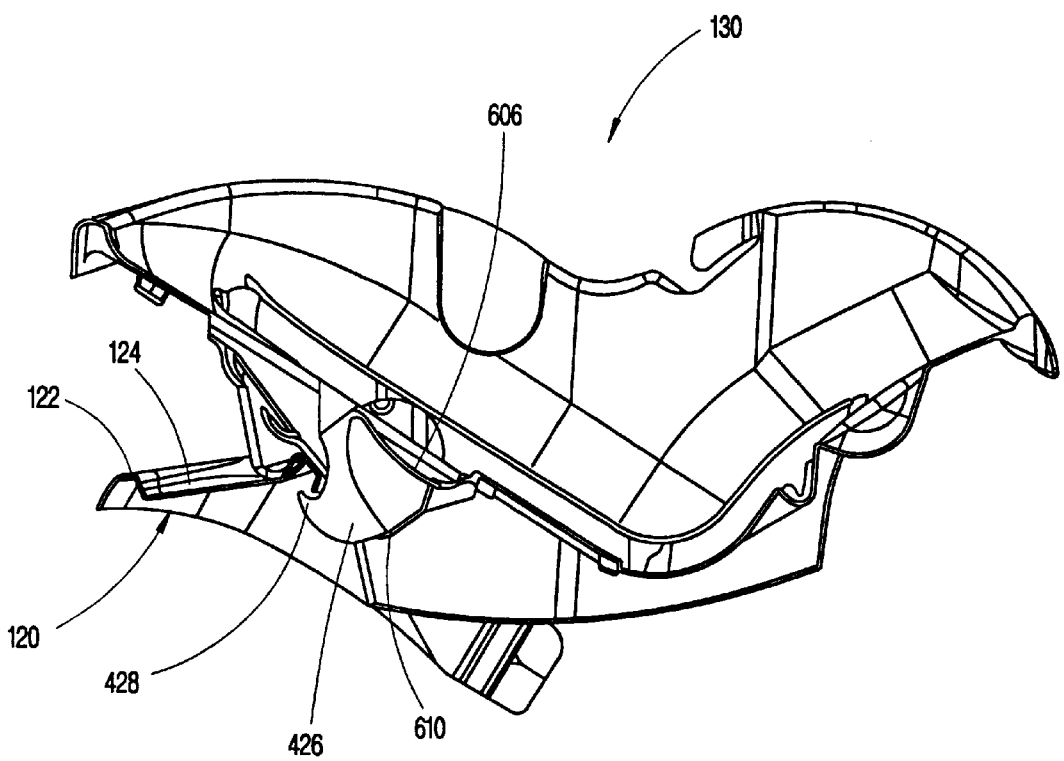
Figure 7C:
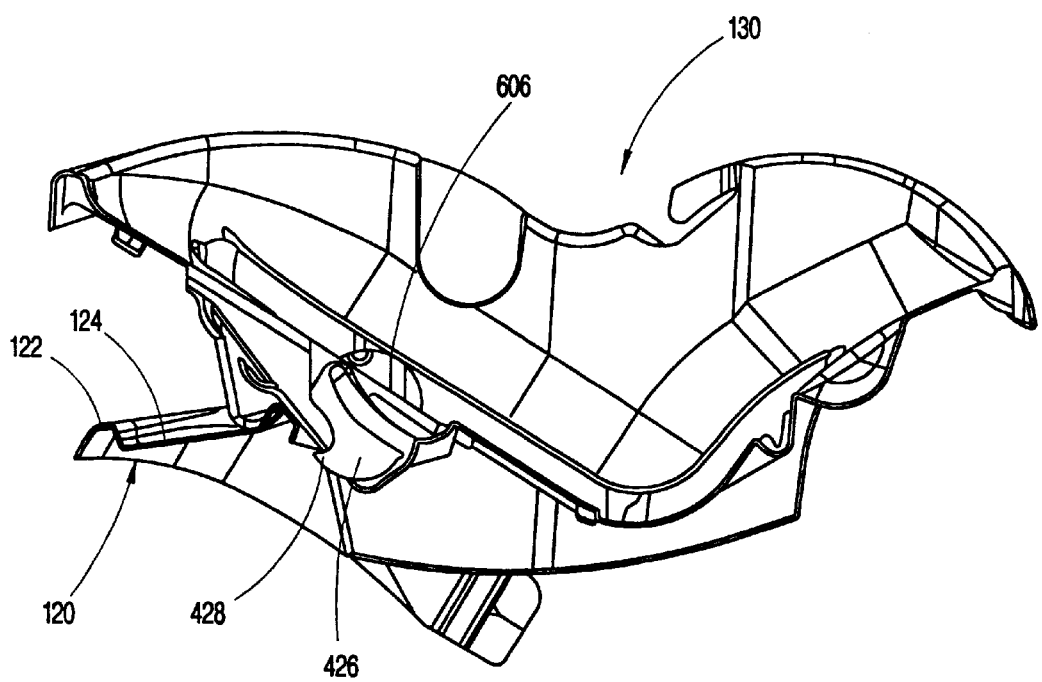

Referring to FIGS. 7A through 7C, the preferred embodiment of the connection between the actuator and the catch 426 is shown. FIG. 7A is a view showing the connection between the catch 426 and the actuator 430. The center arm 432 of the actuator 430 is inserted into the aperture 420 on the boss 418 on the back portion 414 of the frame 146. The biasing portion 606 of the catch 426 is inserted through the aperture 524 of the center arm 432 until the connecting portion 508 of the catch 426 is adjacent the center arm 432 as shown.

As the actuator 430 is pulled upwardly, the center arm 432 of the actuator 430 moves out of the boss 418, causing the catch 426 to pivot about the extensions 602. As the catch 426 pivots, the curved portion 428 of the catch 426 withdraws into the vertical slot 424 of the boss 418.

On the inside of the frame 146 of the infant carrier 130, there is a cavity (not shown) corresponding to the boss 418 on the back portion 414. Each side wall 702 of the cavity 700 has a portion that defines a groove 704. The catch 426 is mounted into the cavity 700 with the extensions 602 engaging the grooves 704 on the side walls 702. The biasing portion 606 of the catch 426 is inserted into slot 706 in the surface of the frame 146. When the biasing portion 606 abuts a lower surface 708 adjacent to the slot 706, the curved portion 428 of the catch 426 is forced out from the vertical slot 424 of the boss 418. The outward movement of the curved portion 428 is limited by a shoulder (not shown) on the catch as the shoulder engages the boss.

FIG. 7B shows the catch 426 engaged with notch on the tray 120, and FIG. 7C shows the catch 426 in the retracted position, disengaged from the tray 120.

Figure 8:
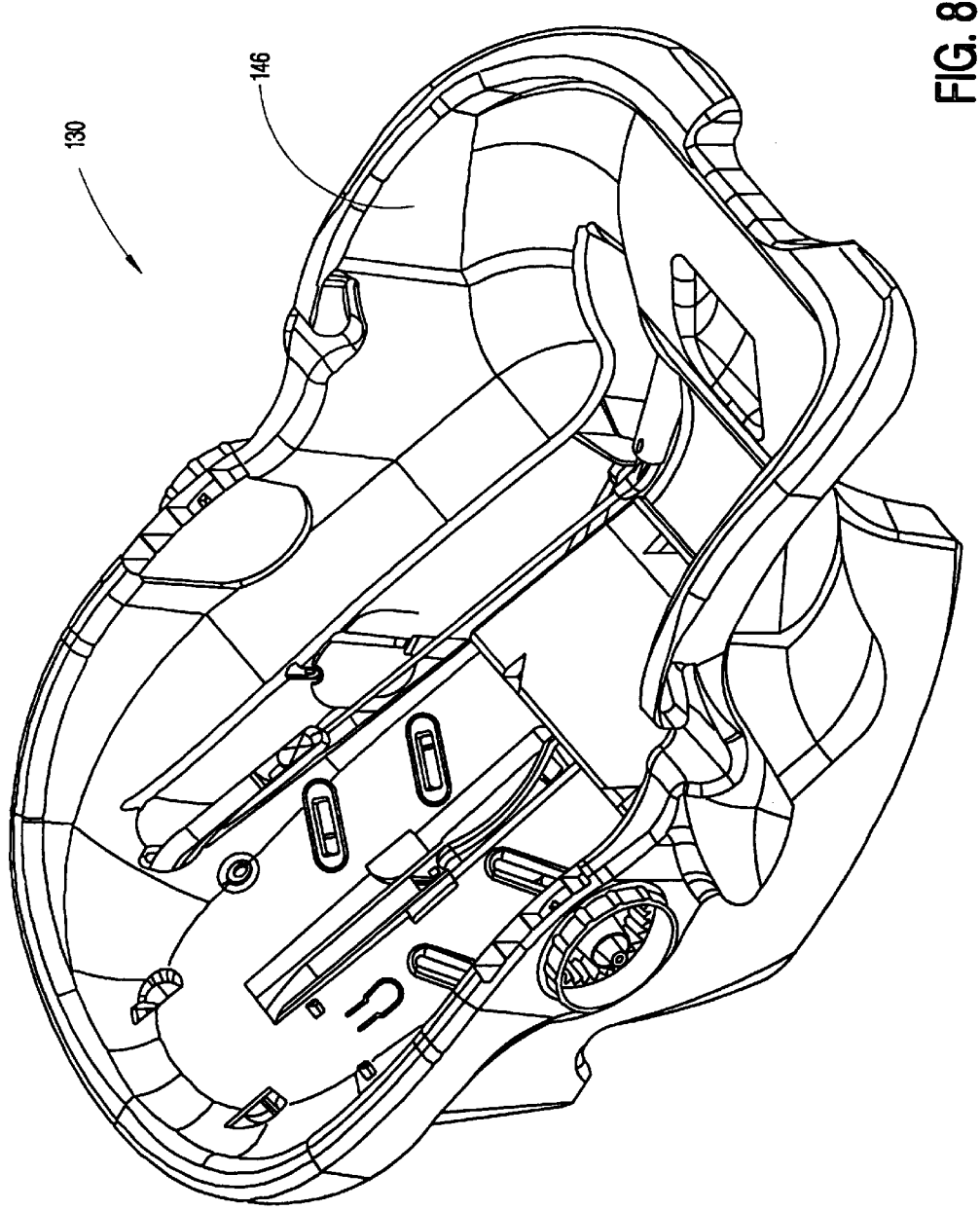
FIG. 8 is an isometric view of the frame of the infant carrier in accordance with the present.

Turning now to the connection between the infant carrier and the base, FIG. 8 shows an isometric view of the infant carrier in accordance with the present invention with the details of the actuator, flexible member, and the lower portion of the flexible member shown in detail. As explained in more detail hereinafter, the actuator, the catch, the flexible member, and the lower portion cooperate to connect and disconnect the car seat from the base unit. The mechanism associated with the infant carrier is described first, then the base unit structure is explained, and finally, the interconnection and cooperation of the infant carrier with the base is described.

Figure 9:
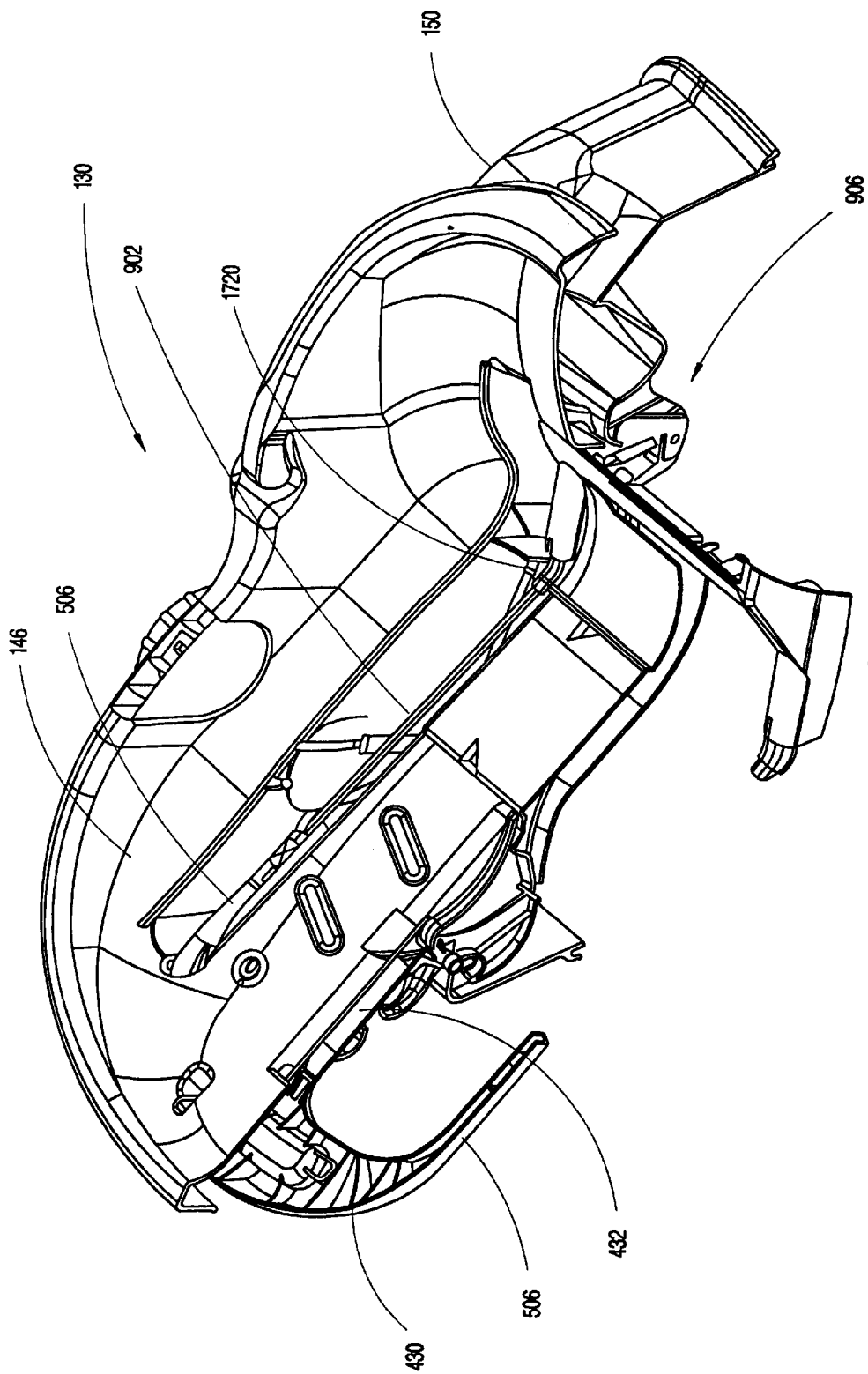
FIG. 9 is an isometric sectional view of the frame shown in FIG. 8.

FIG. 9 shows an isometric cut away view of infant carrier 130. The infant carrier 130 has a frame 146 with several items mounted to it. The actuator 430 is mounted underneath the frame 146 of the infant carrier 130 and moves along the longitudinal axis of the infant carrier 130. As shown in FIG. 9, the actuator is shown in full view, with the left half of the infant carrier cut away. The actuator 430 has two wings (i.e., side arms) 506, and a central arm 432. The central arm 432 and its operation of the catch 426 was previously discussed above with regard to the cooperation and interconnection of the infant carrier with the stroller. The following discussion will focus on the two side arms 506. The two side arms 506 are mirror images, and this discussion will focus on only the right arm in FIG. 9. The particular details of the actuator have been previously described with regard to FIGS. 4 and 5A–5E.

The flexible member 902 is connected at its upper end to a lower end of side arm 506. The flexible member 902 includes a lower portion 906, which will be described in more detail. The lower portion 906 is generally interconnected with a latch mechanism 906. As explained in more detail, the latch mechanism 906 cooperates with a fixed mounting member disposed in the base to secure the infant carrier to the base unit.

Figure 10A:
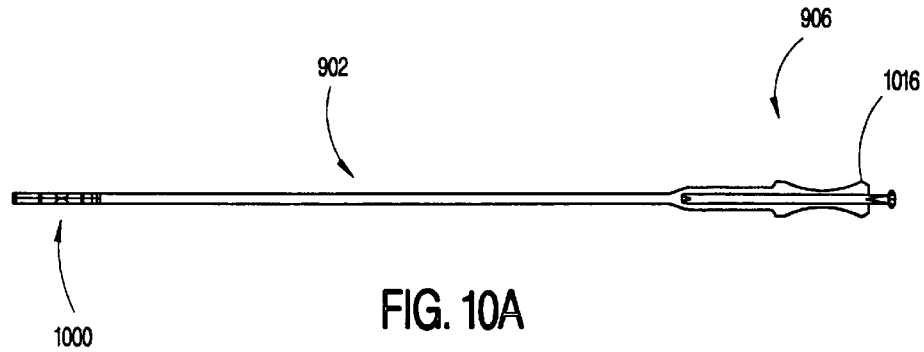
FIGS. 10A–10C are views of a flexible member in accordance with the present invention.
Figure 10B:
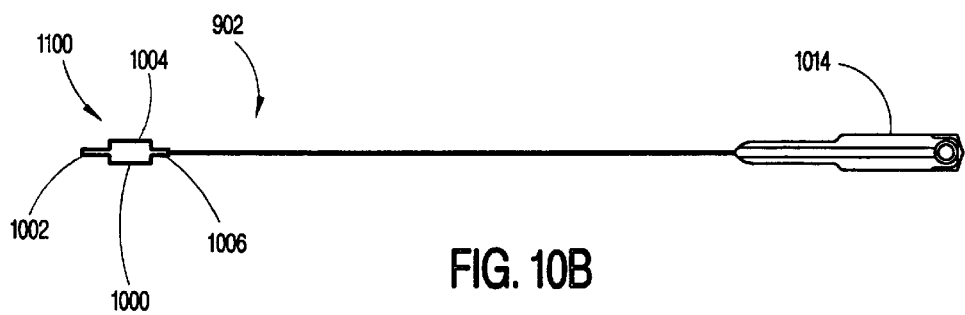
Figure 10C:
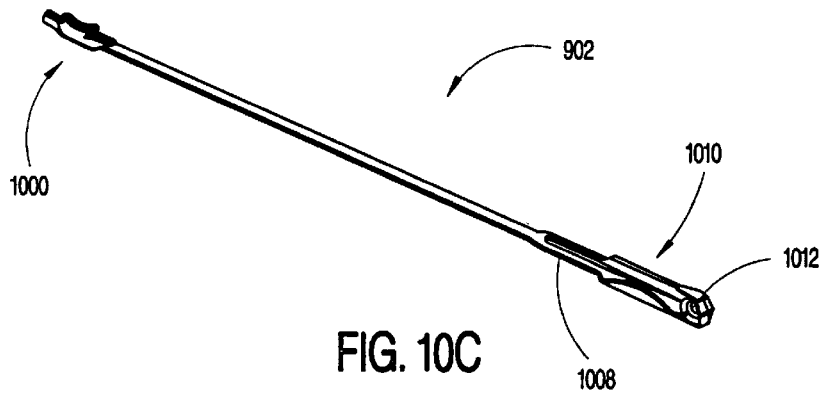

FIGS. 10A–C show the flexible member 902 in a side view, top view, and isometric view, respectively. The flexible member 902 includes an upper connector 1000 which is adapted to connect to the side arm 506 of the actuator 430. As best seen in FIG. 10B, the upper connector 1000 includes a tip 1002, a widened center section 1004, and a tail section 1006.

The lower portion 906 of the flexible connector 902 includes several features, best shown in the isometric view in FIG. 10C. The lower portion 906 generally includes a spring receiving portion 1008, an engagement portion 1010, and a hole 1012. The preferred spring receiving portion 1008 and engagement portion 1010 include a pair of horizontal ribs 1014 and a pair of vertical ribs 1016. These ribs function to stabilize and guide the operation of those portions.

Figure 11:
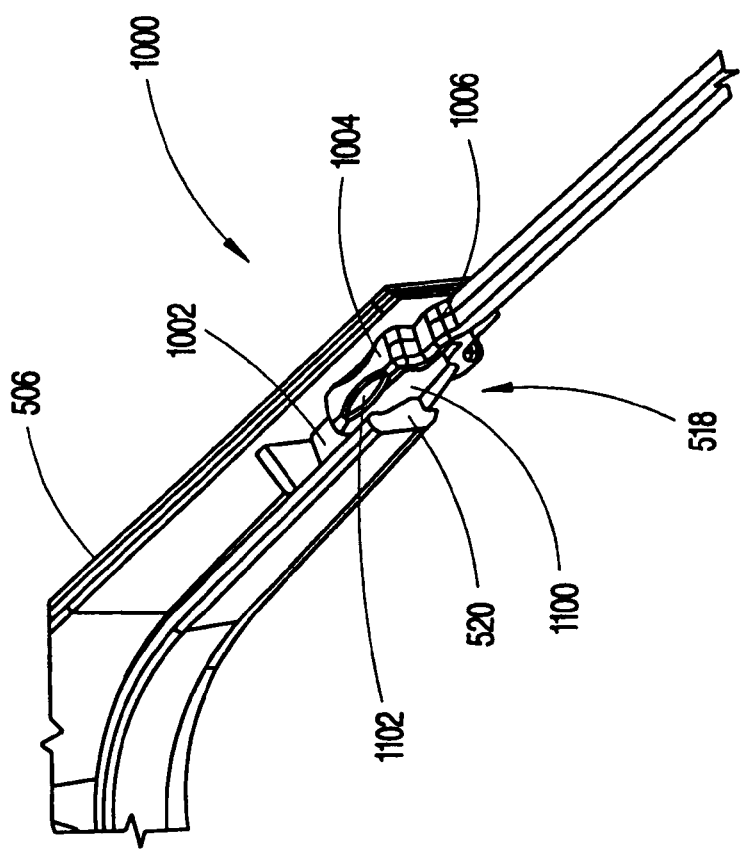
FIG. 11 is a view of the connection between a flexible member and actuator in accordance with the present invention.

Turning now to the interconnection between the upper connector 1000 and the side arm 506 of the actuator 430, FIG. 11 shows an assembled, cutaway of that assembly. In particular, the widened portion 1004 is inserted into the opening 518 to insert the upper connector 1000 to the side arm 506. The cutaway of the side arm 506 shows the tab 520 in cross section. The tab extends into a cavity 1100 disposed on both sides of the widened portion 1004 (as can be seen on the top side of the widened portion 1004), and includes a pair of opposing extensions 1102 shown in FIG. 11. As will be explained, the extensions 1102 are adapted to engage with the tabs 520 to lock the upper connector 1000 into the side arm 506.

FIG. 12 shows an assembled actuator 430 with a pair of flexible members 902 connected thereto. Section lines 12A, 12B, and 12C are shown respectively taken through the portion of side arm 506 as shown in FIG. 12. In particular, section 12A shows a section of the tip 1002 and the side arm 506 in the assembled configuration; section 12B shows a section of the widened portion 1004 and the side arm 5006 in the assembled condition; and section 12C shows a section of the tail portion 1006 and the side arm in the assembled condition.

Figure 12C:
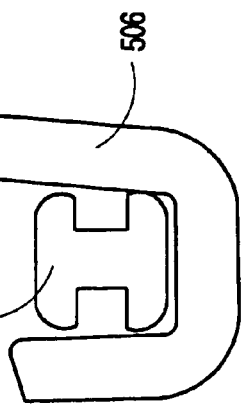
FIGS. 12A–12C are cross-sectional views of the connection shown in FIG. 12.
Figure 12B:
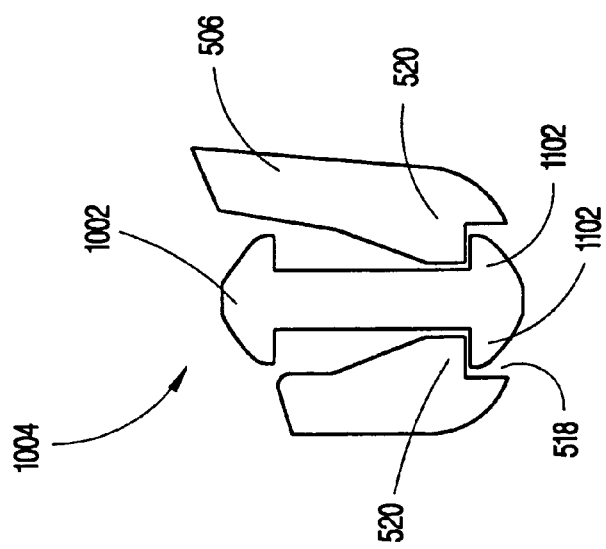
Figure 12A:
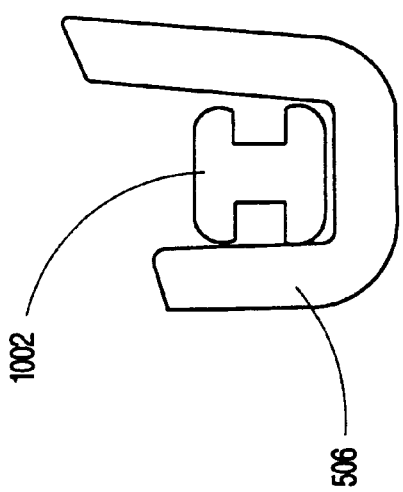

Referring now to FIG. 12A, the tip portion 1002 is shown disposed in a channel of the side arm 5006. As can be seen, the cross section of the tip is most preferably an I-beam configuration.

FIG. 12B shows the widened portion 1004 engaged in the opening 518 of the side arm 506. As can be appreciated, during insertion of the upper connector 1000 into the side arm 506, the widened portion 1004 is disposed above the opening 518 shown in FIG. 12B. The widened portion 1004 is then depressed downward to expand the opening formed by the tabs 520. As will be appreciated, the lower end of the widened portion 1004 includes a pair of opposed sloping portions to aid in the insertion of the widened portion 1004 into the opening 518. After insertion, the extension 1102 abuts and engages the tabs 520 to positively lock the widened portion into the opening 518. As clearly shown in FIG. 12B, the upper end of the widened portion 1004 is a mirror image of the lower portion, and thereby allows the insertion of the connection member in either orientation.

FIG. 12C shows a section of the tail portion 1006 and the side arm 506. The tail portion is also preferably in the form of an I-beam structure.

Figure 13A:
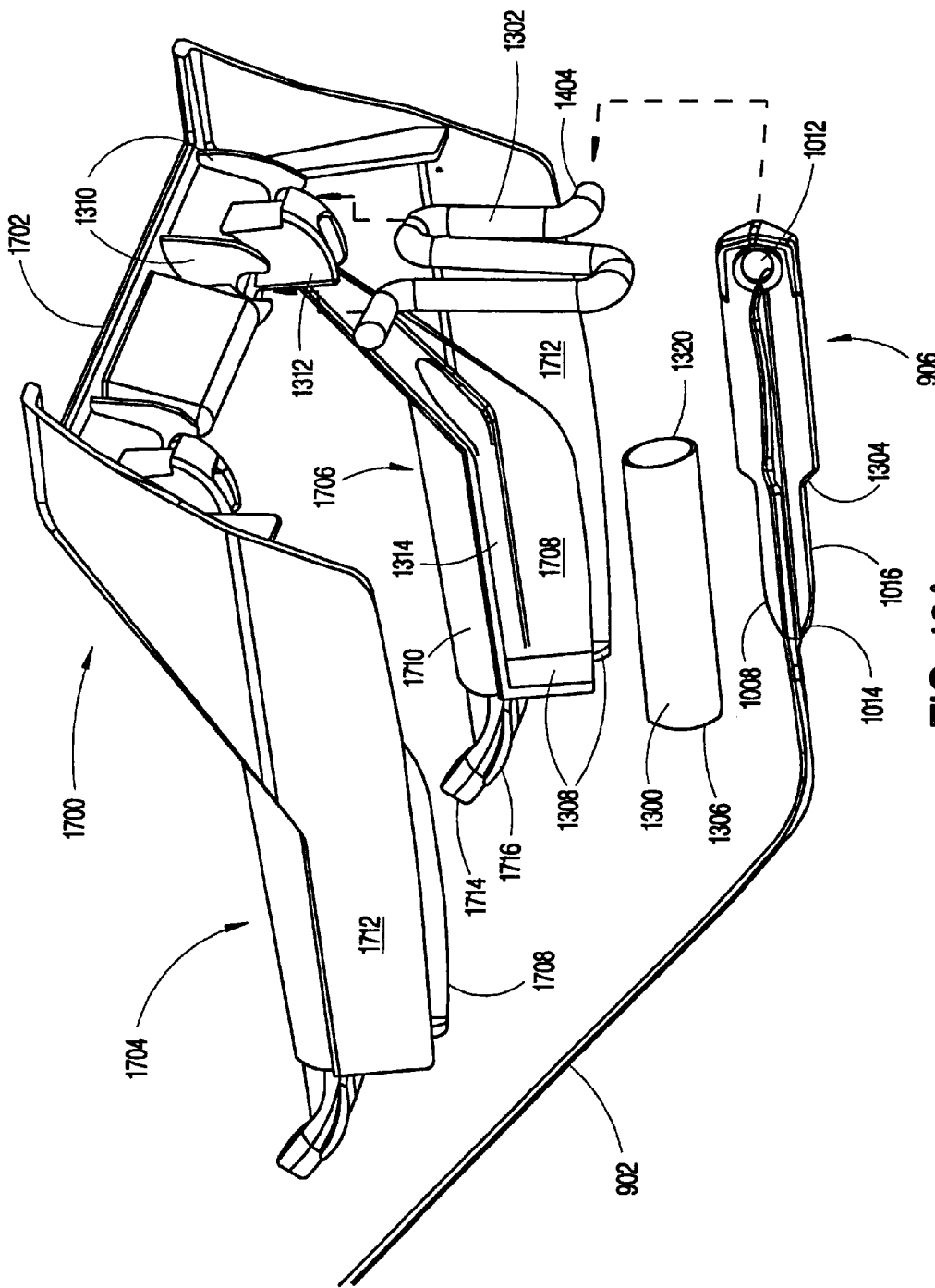

FIG. 13A shows an exploded isometric view of the lower portion of the base 150 of infant carrier 130. The frame 146 of the infant carrier can be made of a single monolithic piece of material, or preferably the frame 146 of the infant carrier 130 can be made of separable members. The preferred embodiment contemplates the use of a cover 1700 rigidly mounted to the frame 146 of the infant carrier 130. In particular, FIG. 13A shows the lower portion 906 of the flexible member 902, a spring 1300 shown schematically as a tubular structure, and a latch 1302, preferably in the form of a bent wire, and cover 1700. The cover 1700 includes a central lateral portion 1702 that extends between a pair of side extensions 1704 and 1706. The two side extensions 1704 and 1706 are structurally similar and contain similar elements. For simplicity, only side extension 1706 will be discussed. It should be understood that side extension 1704 has identical structural elements. Side extension 1706 includes an inner apron 1708, a roof portion 1710, and an outer apron 1712. These three elements cooperate to enclose spring 1300 and prevent foreign objects from interfering with the operation of spring 1300. The rear portion of side extension 1704 includes a guide 1714 and mounting fin 1716. Various dashed arrows show the appropriate assembly of the various components shown in FIG. 13A.

Spring 1300 is initially assembled over the upper connector 1000 and slid along the flexible member 902 to engage the spring receiving portion 1008. The spring is then slid along the horizontal and vertical ribs 1014 and 1016, respectively until a forward end 1320 engages a shoulder 1304 on each of the ribs. As can be appreciated, the horizontal and vertical ribs 1014 and 1016 of the spring receiving portion 1008 align and locate the spring 1300 on the lower portion 906 of the flexible member 902. The rearward end 1306 of the spring 1300 engages against a rear wall 1308 formed on side extension 1706. As will be appreciated, the spring 1300 is a compression spring, which biases the lower portion 906 to the right in FIG. 13A.

FIG. 13B is a rear perspective cut-away view of cover 1700, more particularly, FIG. 13B shows a cut-away of side extension 1706. Portions of side extension 1706 have been cut away to more clearly show certain details. In this figure, spring 1300 can be observed in its installed condition. As mentioned above, spring 1300 is held by a rear wall 1308 formed on side extension 1706, and shoulders 1304 formed on the lower portion 906 of flexible member 902. Compression spring 1300 generally tends to bias the lower portion 906 of flexible member 902 away from rear wall 1308. Guide 1714 includes a large radius, gentle bend, and allows flexible member 902 to roughly follow the contour of the infant carrier 130 as shown in FIG. 9. Guide 1714 receives flexible member 902 at an angle and curves flexible member 902 to a flat horizontal portion 903. Guide portion 1714 allows the flexible member 902 to smoothly bend, thus preventing kinks and allowing flexible member 902 to move smoothly throughout its range of motion. A support rib 1718 is disposed between the rear wall 1308 and the inner curve of guide 1714. The support rib 1718 provides additional strength to the guide 1714.

Figure 14:
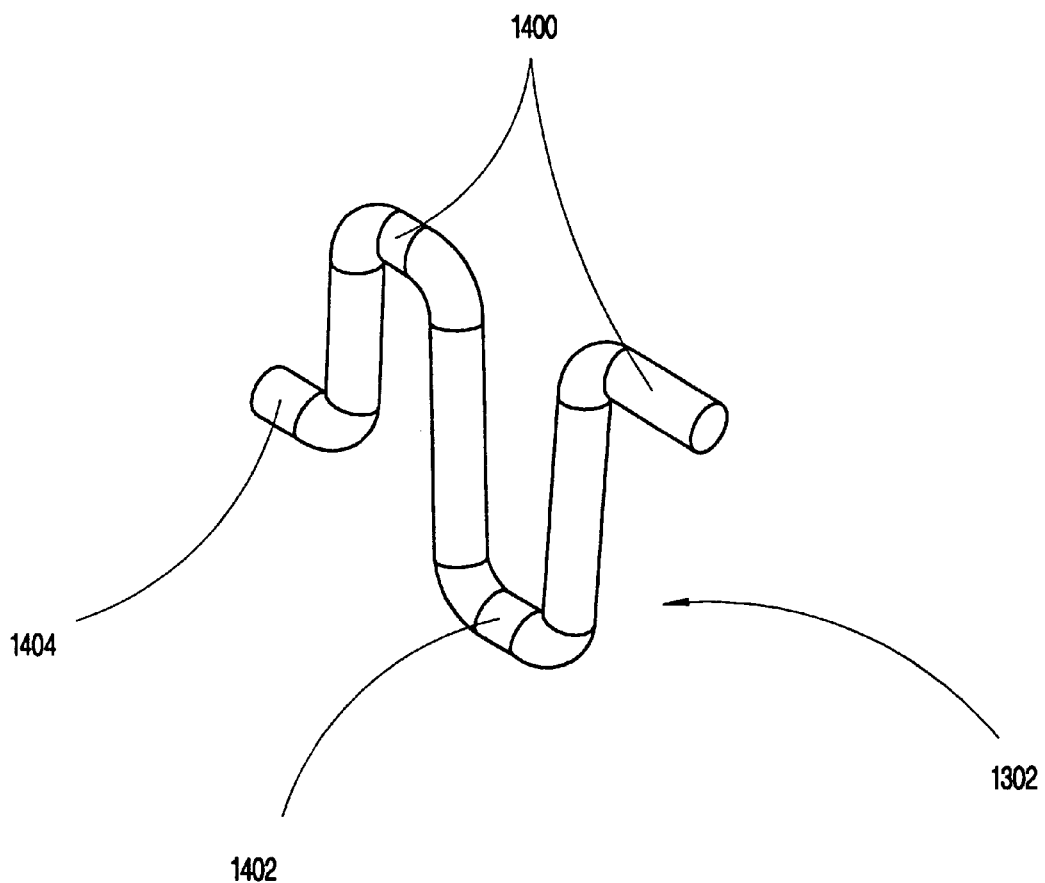
FIG. 14 is an isometric view of the latch.

Referring briefly to FIG. 14, a preferred latch 1302 in the form of a bent wire is shown. Latch 1302 includes a pivoting portion 1400, an engaging portion 1402, and a receiving portion 1404. As will be appreciated, the pivoting portions 1400 are adapted to engage a mounting structure on the bottom surface of the infant carrier 130 in a rotatable fashion. The engaging portion 1402 is configured to engage a fixed mounting member disposed in the base. The receiving portion 1404 is adapted to receive the lower portion 906 of the flexible member 902.

Returning now to FIG. 13A, the lower portion 906 is inserted onto the receiving portion 1404 of the latch 1302. In the preferred embodiment, the hole 1012 of the lower portion is slid over the end of the latch on the receiving portion 1404.

The latch 1302 is then inserted into a receiving structure in the lower portion of the infant carrier 130. In particular, the pivoting portions 1400 of the latch 1302 are inserted into a pair of snap clips 1310 mounted to cover 1700 to allow a strong and rotatable connection therebetween. An extending boss 1312 also extending from cover 1700, is disposed between the snap clips 1310 to laterally locate and stabilize the latch 1302 after installation. The extending boss 1312 is also used to mount the cover 1700 to the frame 146 of infant carrier 130.

The preferred embodiment includes several features used to mount the cover 1700 to the frame 146 of the infant carrier 130. Referring to FIG. 13C and FIG. 19, the mounting fins 1716 on cover 1700 are received by a corresponding number of cover slots 1720 (see FIG. 9) disposed on frame 146 of the infant carrier 130. The mounting system for the forward end of the cover 1700 is shown in FIG. 13C and FIG. 19. Referring to FIG. 13C, a forward cover hook 1722 is formed on the extending boss 1312. FIG. 19 shows details of the assembled carrier and frame 146. As shown in FIG. 19, the forward cover hook 1722 engages a cover receiving lip 1724 formed on frame 146. A mechanical fastener 1726 is also used to connect the cover 1700 with the frame 146. The mechanical fastener 1726 extends through fastener aperture 1728 disposed on cover 1700 and a receiving aperture 1730 formed on fastener boss 1732. The preferred embodiment also includes a forward end rib 1734 disposed on cover 1700 received in a rabbet 1736 disposed on frame 146. All of these mounting features work together to properly align the cover 1700 with frame 146 and also provide a strong joint between cover 1700 and frame 146.

Figure 15:
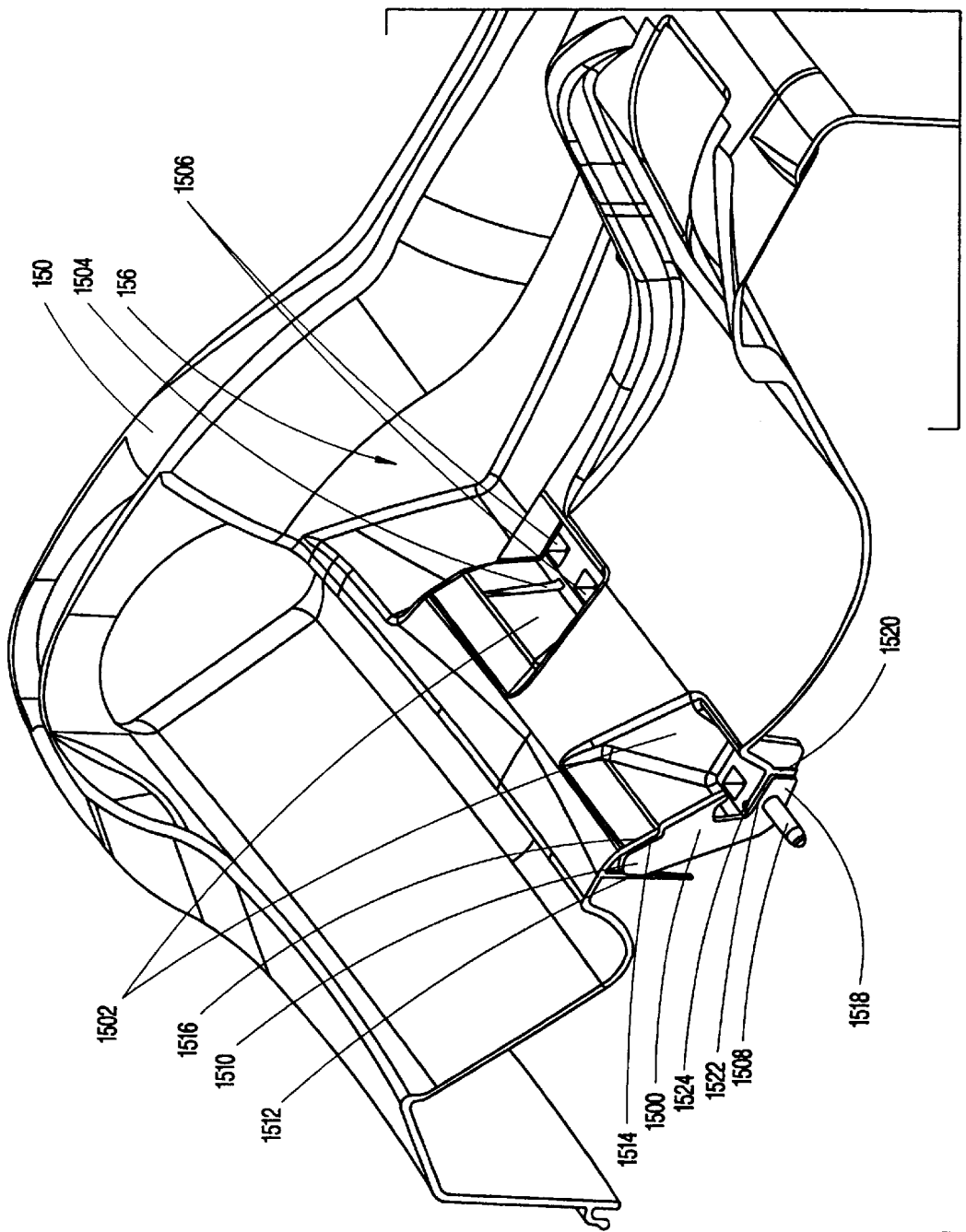
FIG. 15 is a sectional view of the base depicting the fixed mounting member.

FIG. 15 shows an isometric cutaway view of the base 150. The base 150 is cutaway at a location to more clearly show the preferred connection structure of a fixed mounting member. The preferred mounting member comprises a hook 1500, as shown in FIG. 15. As explained above, the base 150 is particularly adapted to receive the lower portion of the infant carrier 130. The base 150 is particularly adapted to receive the ridges 170 of the infant carrier 130 in the receiving grooves 156 (see FIG. 1). The base 150 and the infant carrier 130 are further aligned as the projections 158 in the receiving grooves 156 on the base 150 engage the apertures 406 (see FIG. 4) on the ridges 170 of the infant carrier 130.

As the infant carrier 130 is lowered, the boss 418 (see FIG. 4) on the infant carrier 130 and the actuator 430 engage the cavity 162 on the rear portion 160 of the base 150. The cavity 162 provides clearance for these parts on the infant carrier 130 so that the infant carrier 130 and the base 150 are tightly secured. In general, the complimentary structure of the base 150 functions to properly and securely locate the infant carrier 130 on the base.

The preferred cooperation between the infant carrier 130 and the base 150 involves a three-point connection structure, as previously noted. The first point of connection is between a rounded lip on the base and a catch 426 on the infant carrier 130. Referring particularly now to FIG. 7A, the infant carrier 130 is shown in the installed position on the base 150. The base 150 is sectioned to show a rounded lip 720, which is adapted to engage the catch 426 in a locking configuration. The preferred rounded lip 720 includes a plurality of gussets 722 and 724 disposed across the rounded lip to improve its strength. As can be appreciated, upon lowering of the infant carrier 130, the catch 426 deflects out of the way when its lower surface contacts the rounded lip, and then snaps into the position shown in FIG. 7A to positively lock with the rounded lip. FIG. 9 also shows the infant carrier 130 in the installed configuration on the base and shows the catch 426 engaged with the rounded lip.

The top view of the preferred mounting structure for the fixed mounting member is shown in FIG. 15. As will be appreciated, the preferred pair of fixed mounting members provides the second and third mounting points of the preferred three-point mounting configuration. The preferred structure includes a cavity 1502 in which the fixed mounting member is located. The cavity 1502 includes a slot 1504 opening to the underside of the base 150 to receive the fixed mounting member. The cavity further includes a pair of recessed portions 1506, which create upstanding bosses on the underside of the base 150 to support the fixed mounting member and its attachment system.

The left cavity 1502 is sectioned through the slot 1504 to more clearly show the insertion and location of the preferred hook 1500. The preferred mounting system for the hook 1500 includes a pin 1508, the end of which is shown in FIG. 15. As can be seen in this cross section view, the hook 1500, which is preferably made of metal, is configured to abut several adjacent ribs and surfaces of the base structure to provide for a strong interconnection between the hook 1500 and the base 150, and further to precisely and accurately locate the hook 1500 in the base 150. In particular, a rear portion 1510 of the hook abuts a rib 1512 of the base 150. An upper front portion 1514 abuts a front flange 1516 of the base, with the lower end of that flange abutting a shoulder in the front face. A lower front portion 1518 of the hook 1500 abuts a lower rib 1520 of the base 150 to provide further strength and positioning accuracy. Finally, the lower face 1522 of the hook 1500 abuts a substantially horizontal portion 1524 of the base 150.

Figure 16A:
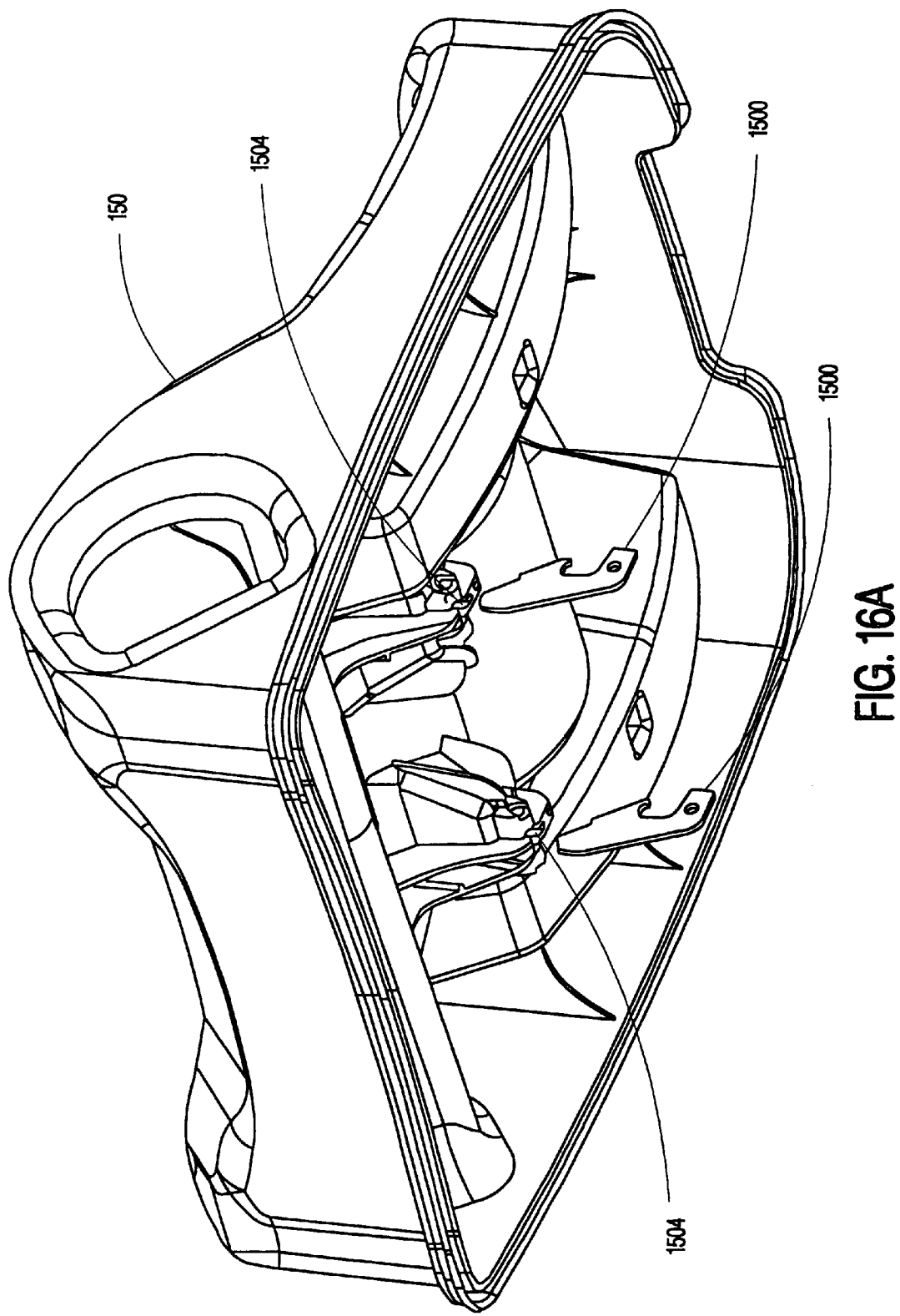
FIGS. 16A–16B are views of the base showing the location of the fixed mounting members.

FIG. 16A shows a bottom isometric exploded view of the base 150 and the preferred hooks 1500 exploded beneath the base and aligned for insertion into respective slots 1504. As will be appreciated, the bottom view reflects many of the complementary details shown in the isometric view of the cavity 1502 in FIG. 15.

Figure 16B:
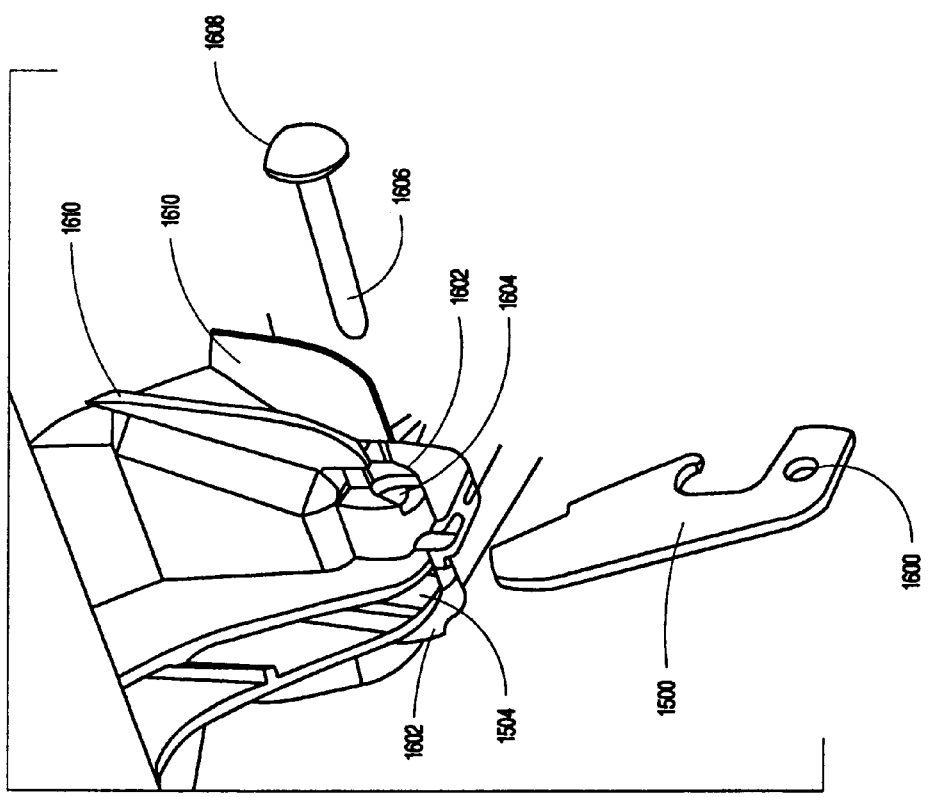

FIG. 16B shows a detail of the left side connection system for the fixed mounting member. In particular, FIG. 16B shows the hook 1500 aligned for insertion in the slot 1504 during assembly, the hook 1500 is inserted into slot 1504 until reaching the position shown in FIG. 15. In that configuration, a hole 1600 in the hook 1500 aligns with an aperture 1604 through a pair of mounting bosses 1602 located on opposites sides of the slot 1504.

After alignment of the hole 1600 with the aperture 1604, a pin 1606 is inserted into the orifice to secure the hook 1500 in place. During insertion of the pin 1606 in the aperture 1604, the head 1608 engages a pair of diagonal retaining flanges 1610. As can be seen in FIG. 16B, these flanges extend from a side wall of the mounting structure and are disposed proximate to the axis of the pin during insertion. As can be appreciated, after the head 1608 contacts the diagonal retaining flanges, the further insertion causes the diagonal retaining flanges 1610 to deflect radially outward from the axis of the pin 1606. Further insertion of the pin allows the head 1608 to pass beyond the diagonal retaining flanges 1610, which then snap back to their original position. Accordingly, the head of the pin is retained in its installed location by the diagonal retaining flanges 1610. As can be appreciated, this preferred mounting structure for the fixed mounting member is extremely easy to use and inexpensive to manufacture because it requires no additional mechanical fasteners to secure the pin in its installed configuration.

Figure 17:
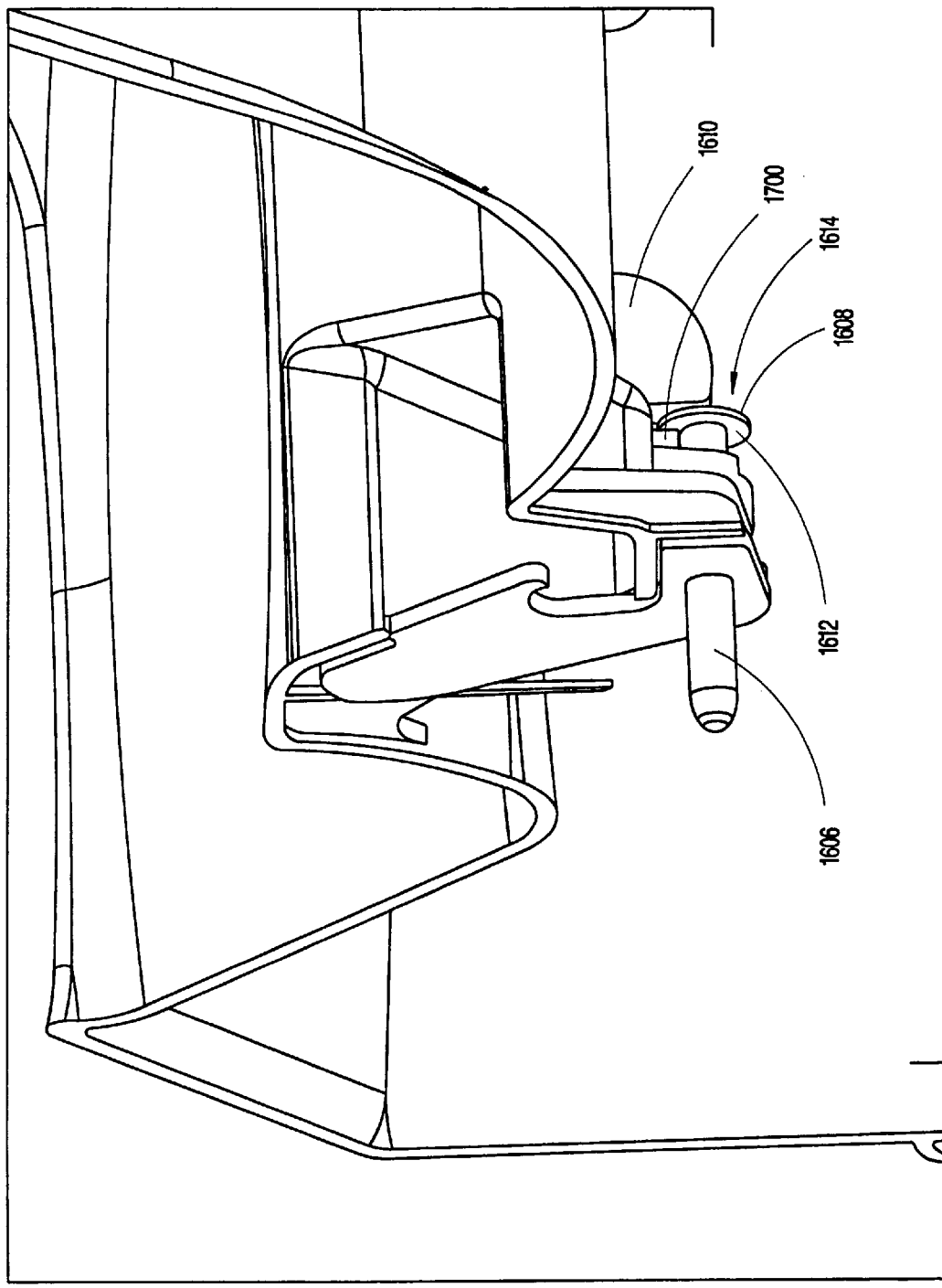
FIG. 17 is an enlarged view of the mounting of the fixed mounting member.

FIG. 17 shows a detail of the fixed mounting member in the installed configuration with a section taken along the slot 1504. In particular, the installed pin 1606 includes a inner surface 1612 of the head 1608 disposed adjacent to a land 1700. The head 1608 further includes an outer surface 1614 bearing against the diagonal retaining flanges 1610, one of which is shown in FIG. 17. The land 1700 and retaining flanges 1610 secure the pin in its installed location.

Figure 18:
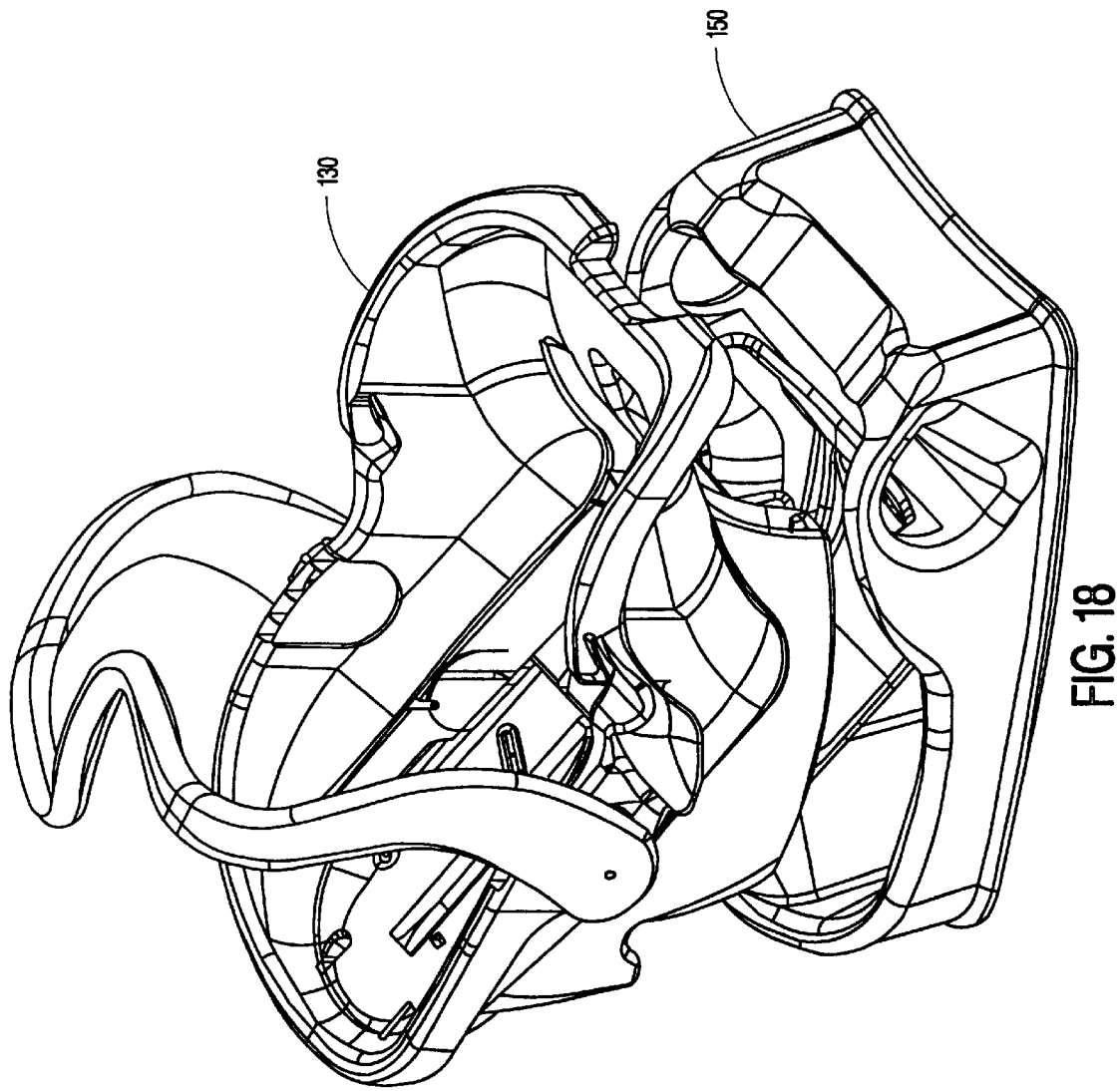
FIG. 18 is a perspective view of the infant carrier and the base in a position just prior to mounting.

FIG. 18 shows the infant carrier 130 and the base 150 positioned for interconnection. As previously described, the various contours of the infant carrier 130 preferably are received into and mesh with mating cavities in the base 150, in the preferred three-point connection system with the catch and the pair of wire latches are utilized to securely mount the infant carrier into the base. As can be appreciated, the preferred three-point connection structure provides an extremely secure mounting system for the infant carrier. In particular, the three-point, triangular configuration prevents the infant carrier from moving with respect to the base in a wide variety of situations, and securely retains the infant carrier 130 in the initial impact and recoil of an accident, for example.

FIG. 19 shows a cut-away view of the infant carrier 130 and the base 150 in the installed configuration. In particular, FIG. 19 shows the latch 1302 engaged with the hook 1500 to secure the infant carrier 130 to the base 150. As can be appreciated, to interconnect the latch 1302 with the hook 1500, the infant carrier 130 simply needs to be lowered on the base 150. Just prior to engagement, the engaging portion 1402 of the latch 1302 contacts the sloping forward surface 1900 of the hook 1500. The latch 1302 rotates slightly to clear the tip 1902 of the hook 1500. As the infant carrier 130 is lowered further, the latch 1302 snaps to the position shown in FIG. 19 due to the biasing force of the spring 1300 as applied to the receiving portion 1404 of the latch 1302 through the lower portion 906.

FIG. 20 shows an isometric cut-away of the latch 1302 engaging the hook 1500 in a similar position to that shown in FIG. 19. This position corresponds to the locked position whereby the infant carrier 130 is securely connected to the base 150.

A tilt indicator can be used to help install the infant carrier 130 to the base 150. Any conventional tilt indicator can be used with the present invention. The preferred infant carrier 130 includes a tilt indicator mounted to one or both of the side walls of frame 146 of infant carrier 130. An exemplary tilt indicator contemplated by the present invention includes a generally opaque circular disk shaped housing mounted to one of the sides of frame 146. Within the housing, a central pole is formed integrally with the housing and along its axis. A plumb member, preferably being a sector of a circle, is disposed within the housing and is mounted coaxially and concentrically radially outward of the central pole of the housing in a manner that allows the plumb member to rotate freely within the housing and about the axis of the housing. Both the plumb member and the housing can include indica. The indica from the plumb member can be designed to align with the indica on the housing when the infant carrier 130 is in its proper angular orientation with respect to the base. Thus, using the tilt indicator, the operator can determine the correct angle of installation of the infant carrier 130 with respect to the base 150 and the operator can more easily and precisely install the infant carrier 130 to the base 150.

FIG. 21 shows the latch 1302 and the hook 1500 in a release position corresponding to the actuation of the actuator 430 (see FIG. 4). As explained above, the movement of the actuator 430 causes the flexible member 902 to move, thereby compressing spring 1300 and rotating the latch 1302 to the position shown in FIG. 21. Furthermore, the catch 426 is rotated out of engagement with the rounded lip 720. In this position, the infant carrier 130 can simply be lifted vertically to remove it from the base 150.

It will be apparent to those skilled in the art that various modifications and variations can be made in the infant carrier, stroller, and base system of the present invention without departing from the spirit or scope of the invention. Thus, it is intended that the present invention cover the modifications and variations of this invention provided they come within the scope of the appended claims and their equivalents.

We claim:

1. A juvenile product kit comprising:
   a stroller including a frame, a seat, and a child restraining member connected to the frame to prevent a child from falling from the seat;
   an infant carrier including a frame, a connection mechanism including a first latch and a second latch, and an actuator carried by the infant carrier frame and operably connected to the first and second latches, wherein the first latch moves between a locked position securing the infant carrier to the child restraining member and an unlocked position allowing the infant carrier to be removed from the stroller; and
   a base unit adapted to be mounted in a vehicle for securing the infant carrier in the vehicle, the base unit including a first engaging portion that receives the first latch, and second and third engaging portions that receive the second latch, the first, second, and third engaging portions being spaced apart from each other, wherein each of the first and second latches is moveable between a locked position securing the infant carrier to the base unit and an unlocked position allowing the infant carrier to be removed from the base unit, and
   wherein the actuator moves both the first and second latches to their respective unlocked positions.

2. The juvenile product kit according to claim 1, wherein the child restraining member is a tray.

3. The juvenile product kit according to claim 2, wherein the tray includes a notch designed to cooperate with the first latch.

4. The juvenile product kit according to claim 1, wherein the infant carrier frame includes support extensions adapted to cooperate with the stroller frame to support and stabilize the infant carrier.

5. The juvenile product kit according to claim 1, wherein the actuator moves between an extended position and a retracted position, wherein moving the actuator from a first one of the retracted and extended positions to a second one of the retracted and extended positions moves both the first and second latches from their respective locked positions to their respective unlocked positions.

6. The juvenile product kit according to claim 5, wherein the actuator includes a finger pull member.

7. The juvenile product kit according to claim 1, wherein the connection mechanism includes a biasing member that biases the first latch to its locked position and a pair of spring members that bias the second latch to its locked position.

8. The juvenile product kit according to claim 1, wherein each of the second and third engaging portions of the base unit has a hook, and both hooks receive the second latch.

9. The juvenile product kit according to claim 8, wherein the second latch comprises first and second engaging portions to which the hooks engage.

10. The juvenile product kit according to claim 1, wherein the infant carrier frame includes support extensions that cooperate with the stroller frame to support and stabilize the infant carrier.

11. The juvenile product kit according to claim 1, wherein the actuator includes a center arm operably connected to the first latch and a pair of side arms operably connected to the second latch.

12. The juvenile product kit according to claim 11, wherein the actuator includes a flexible member connecting to the second latch and each of the side arms.

13. The juvenile product kit according to claim 12, wherein the second latch comprises first and second engaging portions to which the hooks engage.

14. The juvenile product kit according to claim 13, wherein each flexible member connects to one end of the second latch.

15. The juvenile product kit according to claim 1, wherein the first latch is pivotally mounted to the infant carrier and includes a leaf spring that biases the first latch to its locked position.

16. The juvenile product kit according to claim 15, wherein the actuator pivots the first latch from its locked position to its unlocked position.

17. An infant carrier adapted to connect to a base unit and a stroller, wherein the base unit, which is securable to a vehicle, includes first, second, and third relatively spaced apart engaging portions for securing the infant carrier, and wherein the stroller has a child restraining member, the infant carrier comprising:
   a frame;
   a connection mechanism including a first latch and a second latch; and
   an actuator operably connected to the first and second latches,
   wherein the first latch is adapted to connect to the child restraining member of the stroller, and is movable between a locked position adapted for securing the infant carrier to the child restraining member and an unlocked position adapted for allowing the infant carrier to be removed from the stroller,
   wherein the first latch is adapted to connect to the first engaging portion of the base unit and the second latch is adapted to connect to both the second and third engaging portions of the base unit, and each of the first and second latches is movable between their respective locked positions adapted for securing the infant carrier to the base unit and their respective unlocked positions adapted for allowing the infant carrier to be removed from the base unit, and
   wherein the actuator moves both the first and second latches to their respective unlocked positions.

18. The infant carrier according to claim 17, wherein the actuator moves between an extended position and a retracted position, wherein moving the actuator from a first one of the extended and retracted positions to a second one of the extended and retracted position moves both the first and second latches from their respective locked positions to their respective unlocked positions.

19. The infant carrier according to claim 18, wherein the actuator includes a finger pull member.

20. The infant carrier according to claim 17, wherein the connection mechanism includes a biasing member that biases the first latch to the locked position and a pair of spring members that bias the second latch to the locked position.

21. The infant carrier according to claim 17, wherein the second latch is adapted to engage hooks on each of the second and third engaging portions of the base unit.

22. The infant carrier according to claim 21, wherein the second latch comprises first and second engaging portions, which are adapted to engage the hooks.

23. The infant carrier according to claim 17, wherein the infant carrier frame includes support extensions adapted to cooperate with the stroller to support and stabilize the infant carrier.

24. The infant carrier according to claim 17, wherein the actuator includes a center arm operably connected to the first latch and a pair of side arms operably connected to the second latch.

25. The infant carrier according to claim 24, wherein the actuator includes a flexible member connecting the second latch and each of the side arms.

26. The infant carrier according to claim 25, wherein the second latch comprises first and second engaging portions, which are adapted to respectively engage hooks on each of the second and third engaging portions of the base unit.

27. The infant carrier according to claim 26, wherein each flexible member connects to one end of the second latch.

28. The infant carrier according to claim 17, wherein the first latch is pivotally mounted to the infant carrier and includes a leaf spring that biases the first latch to its locked position.

29. The infant carrier according to claim 28, wherein the actuator pivots the first latch from its locked position to its unlocked position.

30. An infant carrier and base combination comprising:
   a base unit adapted for securing to a vehicle, the base unit including first, second, and third engaging portions; and
   an infant carrier comprising:
      a frame;
      a connection mechanism including a first latch and a second latch; and
      an actuator operably connected to the first and second latches,
      wherein the first latch connects to the first engaging portion of the base unit and the second latch connects to both the second and third engaging portions of the base unit, the first, second, and third engaging portions being spaced apart from each other, and each of the first and second latches is movable between respective locked positions securing the infant carrier to the base unit and respective unlocked positions allowing the infant carrier to be removed from the base unit, and
      wherein the actuator moves both the first and second latches to their respective unlocked positions.

31. The infant carrier and base combination according to claim 30, wherein the actuator moves between an extended position and a retracted position, wherein moving the actuator from a first one of the extend and retracted positions to a second one of the extended and retracted positions moves both the first and second latches from their respective locked positions to their respective unlocked positions.

32. The infant carrier and base combination according to claim 31, wherein the actuator includes a finger pull member.

33. The infant carrier and base combination according to claim 30, wherein the connection mechanism includes a biasing member that biases the first latch to the locked position and a pair of spring members that bias the second latch to the locked position.

34. The infant carrier and base combination according to claim 30, wherein each of the second and third engaging portions of the base unit has a hook, and the second latch engages both of the hooks.

35. The infant carrier and base combination according to claim 34, wherein the second latch comprises first and second engaging portions, each of which engages one of the hooks.

36. The infant carrier and base combination according to claim 30, wherein the actuator includes a center arm operably connected to the first latch and a pair of side arms operably connected to the second latch.

37. The infant carrier and base combination according to claim 36, wherein the actuator includes a flexible member connecting to the second latch and each of the side arms.

38. The infant carrier and base combination according to claim 37, wherein the second latch comprises first and second engaging portions, which engage the hooks.

39. The infant carrier and base combination according to claim 38, wherein each flexible member connects to one end of the second latch.

40. The infant carrier and base combination according to claim 30, wherein the first latch is pivotally mounted to the infant carrier and includes a leaf spring that biases the first latch to its locked position.

41. The infant carrier and base combination according to claim 40, wherein the actuator pivots the first latch from its locked position to its unlocked position.

* * * * *